(12) United States Patent
Compann et al.

(10) Patent No.: US 10,820,219 B2
(45) Date of Patent: Oct. 27, 2020

(54) BROADBAND DIAGNOSTICS SYSTEM

(71) Applicants: Julianne Compann, Gainesville, GA (US); K. Scott Helms, Canton, GA (US)

(72) Inventors: Julianne Compann, Gainesville, GA (US); K. Scott Helms, Canton, GA (US)

(73) Assignee: VTrum Group LLC, Alpharetta, GA (US)

( * ) Notice: Subject to any disclaimer, the term of this patent is extended or adjusted under 35 U.S.C. 154(b) by 373 days.

(21) Appl. No.: 14/794,045

(22) Filed: Jul. 8, 2015

(65) Prior Publication Data
US 2015/0312786 A1 Oct. 29, 2015

Related U.S. Application Data

(63) Continuation of application No. 14/031,021, filed on Sep. 18, 2013, now Pat. No. 9,112,718.

(60) Provisional application No. 61/790,083, filed on Mar. 15, 2013.

(51) Int. Cl.
| | | |
|---|---|---|
| H04L 12/26 | (2006.01) |
| H04W 24/08 | (2009.01) |
| H04L 12/24 | (2006.01) |
| H04L 12/28 | (2006.01) |
| H04W 88/08 | (2009.01) |

(52) U.S. Cl.
CPC ......... *H04W 24/08* (2013.01); *H04L 12/2801* (2013.01); *H04L 41/32* (2013.01); *H04L 43/50* (2013.01); *H04W 88/08* (2013.01); *H04L 43/067* (2013.01)

(58) Field of Classification Search
CPC . H04L 41/32; H04L 12/2801; H04L 12/2402; H04L 12/2403; H04L 12/2405; H04L 12/2407; H04L 12/2408; H04L 12/2409; H04L 12/241; H04L 12/2413; H04L 12/2419; H04L 12/2424; H04L 12/2463; H04L 12/2486; H04W 24/02; H04W 24/04; H04W 24/06; H04W 24/08; H04W 24/10
See application file for complete search history.

(56) References Cited

U.S. PATENT DOCUMENTS

| | | | |
|---|---|---|---|
| 6,795,935 B1* | 9/2004 | Unkle | G05B 23/0275 340/438 |
| 2004/0054771 A1* | 3/2004 | Roe | H04L 41/00 709/224 |
| 2005/0144648 A1* | 6/2005 | Gotwals | H04N 7/17309 725/111 |
| 2008/0059106 A1* | 3/2008 | Wight | G06F 11/3688 702/119 |
| 2009/0097554 A1* | 4/2009 | Savoor | H04M 11/062 375/240.08 |

(Continued)

*Primary Examiner* — Bo Hui A Zhu
(74) *Attorney, Agent, or Firm* — Lightbulb IP, LLC

(57) ABSTRACT

A broadband diagnostics system provides the capability to collect, store and recall historical data for the purpose of comparing to current and existing network elements and conditions. The system allows testing, troubleshooting, tracking, identifying and logging information pertaining to cable, xDSL, FTTx and other networks, and their associated elements. The system also provides identification and testing of network elements deployed at various customer premises, behind a demarcation device.

20 Claims, 18 Drawing Sheets

(56) References Cited

U.S. PATENT DOCUMENTS

| | | | | |
|---|---|---|---|---|
| 2013/0051247 A1* | 2/2013 | Reese | ................ | H04L 43/08 |
| | | | | 370/242 |
| 2013/0151893 A1* | 6/2013 | Gorecha | ............ | G06F 11/0736 |
| | | | | 714/15 |
| 2014/0180658 A1* | 6/2014 | Rossi | ................ | E21B 49/00 |
| | | | | 703/10 |

* cited by examiner

BROADBAND DIAGNOSTICS SYSTEM

CROSS-REFERENCE TO RELATED APPLICATION

This application is a continuation of U.S. patent application Ser. No. 14/031,021, filed Sep. 18, 2013, which claims priority to U.S. Provisional Patent Application No. 61/790,083, filed Mar. 15, 2013.

BACKGROUND OF THE INVENTION

1. Field of the Invention

The invention relates generally to testing and diagnostic analysis internet modems and in particular to a software based broadband diagnostics system for testing and diagnostic analysis of xDSL and cable modems and routers at the customer premises, and their associated cable facilities.

2. Related Art

The devices, features and functions described herein are intended to address shortcomings in traditional testing methodologies implemented to diagnose and troubleshoot xDSL and cable modems, and their associated wire-line based facilities. There are currently a variety of test sets, systems, software platforms and the like that provide testing of these devices, but the broadband diagnostics system described herein addresses additional unique and specific needs, including (but not limited to) combining multiple testing capabilities, platforms and architectures into a single system. The broadband diagnostics system introduces new features and functions to improve testing and troubleshooting capabilities, as well as providing new ways to actively compare analytic data. While the broadband diagnostics system utilizes both wired (PC's, laptops, desktops, main frames, test systems and other devices) and wireless technology (like smartphones, pads, tablets and other communications devices), the examples and drawings herein were limited to operation from a standard PC only. This was done to ease understanding and provide clarity to the submission.

From the discussion that follows, it will become apparent that the present invention addresses the deficiencies associated with the prior art while providing numerous additional advantages and benefits not contemplated or possible with prior art constructions.

SUMMARY OF THE INVENTION

The broadband diagnostics system disclosed herein provides testing and diagnostic capabilities for the purpose of identifying failure and trouble mechanisms that exist in the xDSL and Cable Modems, and their associated networks (also referred to as network facilities). As will be described herein, the system includes functionality allowing expanded search options, enhanced screen refresh rates, and detailed facility and modem diagnostic information, allowing testers to see equipment deployed within the network that resides behind the customers modem(s).

There are a variety of methods for delivering residential Internet services, including cable, FTTx and xDSL technology. Cable technology utilizes a cable TV transport to deliver the signals to the consumer, while the xDSL technology delivers signals via telephone lines. These two technologies and their associated transmission architecture vary greatly from one another. The broadband diagnostics system disclosed herein uniquely allows testing, troubleshooting and diagnostics for both types of networks. The combination of these specific testing methodologies and architectures presents a significant value to those who are versed in the art.

The broadband diagnostics system also provides search options as a way for the tester to identify a customer's modem remotely by incorporating a specific set of parameters to define the search. While many techniques exist for searching information and data, the search criteria disclosed herein combines a specific set of variables to quickly and effectively identify the customer equipment or network being sought. Criteria to initiate the advanced search capability includes (but is not limited to) a combination of the subscriber's phone number, email address, last name, billing information, IP and MAC address or other unique identifier of the cable modem, xDSL modem or EMTA device. By enabling this combination of criteria to initiate a search, the tester can quickly identify and isolate the exact system they are seeking for the testing and troubleshooting exercise.

In addition to the manual screen refresh feature, the modem diagnostic screen of the broadband diagnostics system incorporates an automatic refresh rate (60 seconds) that can be enabled, disabled or modified. Typical systems of this type offer only manual (tester intervention) refresh of the testing parameters being tracked and/or monitored. This refresh rate allows the tester to immediately identify and isolate changes in the network as they happen, as opposed to collecting like data over a period of time and performing a manual comparison of the information to identify trending.

The broadband diagnostics system displays detailed information on the bonded channels for DOCSIS 3 type cable modems and their associated networks. Typical testing implementations provide information on the assigned channel only, and do not include signal information pertaining to the bonded channels. Channel bonding allows the provider to enhance the bandwidth delivered to the customer by combining two or more adjacent signal channels, providing higher levels of bandwidth for both the transmission (to) and reception (from) the customers modem.

In addition, the broadband diagnostics system allows the tester to view equipment that is directly (wired or wirelessly) connected to the customer's network, beyond the demarcation device (modem or router). This expanded visibility customer premises equipment enables faster identification and isolation of problems, while minimizing the need for the service provider to dispatch technicians to the customer's premises to perform diagnostic testing and troubleshooting.

The broadband diagnostics system provides a display panel that allows the tester to see both current and historical data about each network, each network element, and their associated geographic location. The information is gathered (as an example) in fifteen-minute intervals (with live RF Data), allowing the tester to monitor and track changes and trends across multiple networks and network elements simultaneously. The system allows for tracking and monitoring of xDSL and Cable networks and their associated network elements. Information tracked and presented includes (but is not limited to) RF levels for the customer's modem(s), signal to noise ratio, up and downstream level detection and display(s) for all bonded channels of DOCSIS 3.0 modems. The data can be used for a variety of purposes, including troubleshooting, tracking trends, comparing networks and/or network devices, and other research and testing implementations. The capability to collect and store technical information about networks and their associated components is particularly useful when diagnosing network conditions that are not classified as a "hard failure". Specifically, when a network or modem is showing signs of poor or degrading performance, comparing the historical data with current data will allow a tester to isolate, identify and ultimately resolve network trouble.

Functional information collected about the modems and their associated networks can be compared within the device for the purpose of identifying and isolating specific behavioral patterns and/or trends. The comparison functionality allows the tester to select the data for comparison, and then choose the manner in which the data can be displayed. Some of these include side-by-side, multiple overlays (stacking of specific charts and trend lines), color variations and other embodiments. The tester can select historical data to compare (by using a check box, as an example), allowing easy access and identification of the data being selected. Line charts, graph charts, spreadsheets and other visual embodiments of the historical data may be present within the system to allow detailed comparison of the data.

As detailed herein, the broadband diagnostics system may have a variety of configurations. For instance, in one exemplary embodiment a broadband diagnostics system comprises a client device having a display screen and one or more input devices for receiving input from a user, a first communication device in communication with the client device via a first network, and a second communication device in connected to a second network, the second network comprising a demarcation device and customer premises equipment. The second communication device receives diagnostic information from the demarcation device and customer premises equipment.

The broadband diagnostics system also includes a storage device is included to store the diagnostic information, and a processor. The processor is configured to receive the diagnostic information at the second communication device, store the diagnostic information on the storage device, receive the input from the user at the first communication device, and transmit a subset of the diagnostic information to the client device via the first communication device. The subset of diagnostic information is selected based on the input from the user, and transmitted according to a refresh rate defined in the input from the user, and is presented to the user on the display screen of the client device.

It is noted that the demarcation device may be a DOCSIS 3.x cable modem, DSL modem or other modem. In addition, the subset of diagnostic information may consist of bonded channel signal information for a demarcation device. The bonded channel signal information may be presented on the display screen of the client device along with reference diagnostic information for comparison purposes. The processor may be further configured to retrieve a requested subset of the diagnostic information from the storage device, and to transmit the requested subset of the diagnostic information to the client device. For instance, historical diagnostic information may be retrieved for use in diagnosing a problem or comparison to current diagnostic information.

The input from the user may request identification of customer premises equipment and the subset of diagnostic information transmitted to the client device may identify at least the model of the customer premises equipment as a result. Alternatively or in addition the input from the user may comprise search criteria for identifying particular customer premises equipment and the subset of diagnostic information transmitted to the client device may relate to the particular customer premises equipment as a result.

In another exemplary embodiment, a broadband diagnostics system comprises a first communication device in communication with a client device on a first network, a second communication device in communication with a second network, the second network comprising a demarcation device and customer premises equipment, and a storage device configured to store diagnostic information received from the demarcation device and the customer premises equipment received via the second communication device. It is noted that the first network and second network are typically not in communication with one another. The demarcation device may be a DOCSIS 3.x cable modem and/or DSL modem.

A processor is also provided, with such processor being configured to receive user input from the first communication device requesting diagnostic information for the demarcation device, and to transmit a subset of the diagnostic information consisting of bonded channel information at the customer premises equipment along with reference diagnostic information to the client device via the first communication device in response to the user input. The subset of diagnostic information is transmitted periodically according to a refresh rate received from the client device via the first communication device.

It is contemplated that the subset of diagnostic information and reference diagnostic information may be presented together on the client device for comparison purposes. The processor may be further configured to receive user input from the first communication device requesting identification of the customer premises equipment, and to transmit a subset of the diagnostic information identifying at least the model of the customer premises equipment to the client device via the first communication device in response to the user input.

Alternatively or in addition, the processor may be further configured to receive user input from the first communication device identifying a subset of the customer premises equipment, and to transmit a subset of the diagnostic information for the subset of customer premises equipment to the client device via the first communication device in response to the user input.

The processor may be further configured to receive user input from the first communication device identifying a subset of the diagnostic information stored on the storage device, and to transmit the subset of diagnostic information from the storage device to the client device via the first communication device in response to the user input. The diagnostic information from the storage device may be used in a historical comparison between current diagnostic information and historical diagnostic information previously stored on the storage device.

Various diagnostic methods are also disclosed herein. For instance, in one exemplary embodiment, a method for diagnosing a broadband connection with a broadband diagnostics system comprises establishing communication with a client device at a first network via a first communication device, and establishing communication with a second network via a second communication device with the second network comprising a demarcation device and customer premises equipment.

The method also includes receiving diagnostic information from the demarcation device and customer premises equipment via the second communication device, storing the diagnostic information on a storage device; and receiving user input from the client device via the first communication device. A subset of the diagnostic information is periodically transmitted to the client device according to a user defined refresh rate, wherein the subset of diagnostic information is selected based on the user input. The subset of diagnostic information is presented to a user on the client device. The refresh rate may be received from the client device.

The subset of diagnostic information may comprise bonded channel information from the demarcation device. In addition, the reference diagnostic information may be transmitted to the client device for comparison with the bonded channel information from the demarcation device. The bonded channel information may be presented along with the reference diagnostic information on the client device for comparison purposes. It is contemplated that the reference diagnostic information may be provided by separate customer premises equipment. In addition or alternatively, the subset of diagnostic information may identify at least a model of the customer premises equipment.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Figure 1A:
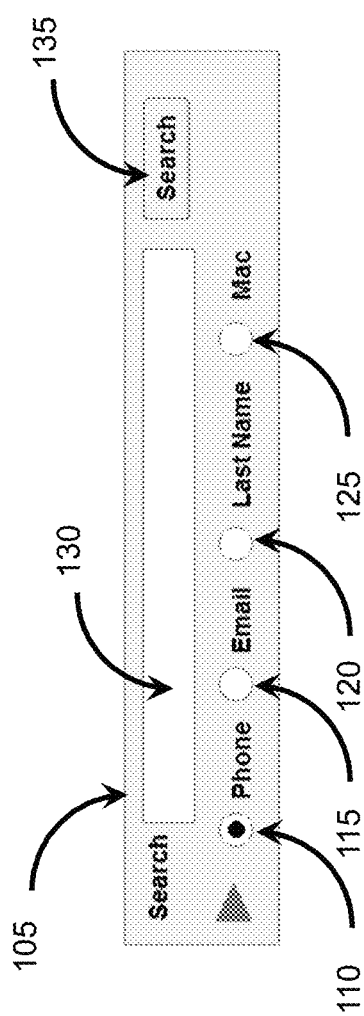
FIG. 1A illustrates an exemplary Standard Search Options screen.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the broadband diagnostics system disclosed herein is intended to provide detailed diagnostic and statistical information about a network and its associated elements (e.g., xDSL, cable and other broadband modems) being deployed, tested, accessed and configured thereon. The diagnostic information is provided for multiple purposes, including but not limited to testing, trouble shooting, diagnosing, identifying and facilitating for the deployment and management of the disclosed network elements. As will be described further below, the broadband diagnostics system may be provided, implemented and/or deployed in various physical embodiments including smartphones, tablets, PC's and other computing devices.

To ease understanding of the submission, the disclosure herein is separated into sections to allow the specific systems and methods to be clearly described. As described below, these systems and methods include advanced search options, screen refresh rates, the ability to see the MAC addresses and identifiers of devices deployed behind the customer's modem, enhanced RF displays, modem compare features and other embodiments.

It is noted that one or more or all of the specific systems and methods may be provided as part of a single testing and troubleshooting system. In addition, it is contemplated that, though certain functionality is disclosed herein as being activated by particular user interface elements or controls (such as buttons), various user interface elements or controls could be used to access, activate or otherwise use the testing system described herein.

Multiple Signal Diagnostics

In general, the broadband diagnostics system allows a tester to view, analyze, diagnose, track and otherwise identify signals from xDSL networks and cable networks. Each of these networks are specific and adhere to a different set of electrical and transmission standards. For instance, xDSL is defined as a "Digital Subscriber Line" signal that is carried over a typical twisted pair (telephone line) facility. The xDSL signals can include (but are not limited to) ADSL (Asymmetrical Digital Subscriber Line), HDSL (High-Bit-Rate Digital Subscriber Line), VoDSL (Video over Digital Subscriber Line), and other DSL iterations. It is contemplated that future manifestations of the xDSL type signaling will also be included in the broadband diagnostics system. Cable networks are typically designed to carry both broadband and cable television signals, and are typically deployed with a coaxial type cable or hybrid fiber coaxial type cable. The broadband diagnostics system can monitor, isolate, analyze, sectionalize, identify, and otherwise track a variety of signals carried over both of these mediums. While many systems exist that can facilitate the testing of one type or another (either cable or xDSL), the broadband diagnostics system facilitates both. It is contemplated that the broadband diagnostics system can additionally include wireless broadband signaling and diagnostic capabilities.

Search Options

The search options present provided by the broadband diagnostics system provide methods for locating and identifying networks and associated network elements within the geographic area of the testing being performed. Typical systems employ a limited set of parameters to perform a search, which may include items like the customer's name, address and/or account information.

Operation of the standard search options will now be described with respect to FIG. 1A. As can be seen, the user (hereinafter the "tester") will typically be presented with a standard search option screen 105. The standard search screen 105 allows the tester to search by a limited set of user input in the form of search criteria. In the embodiment of FIG. 1A for example, search criteria includes phone 110, email 115, last name 120 and MAC address 125 radio buttons. The tester may select a desired search option by engaging one of the radio buttons 110, 115, 120 or 125 and then inputting the specific search criteria into the provided search input field 130. The search may be initiated when the tester engages a search button 135 or by other input.

Figure 1B:
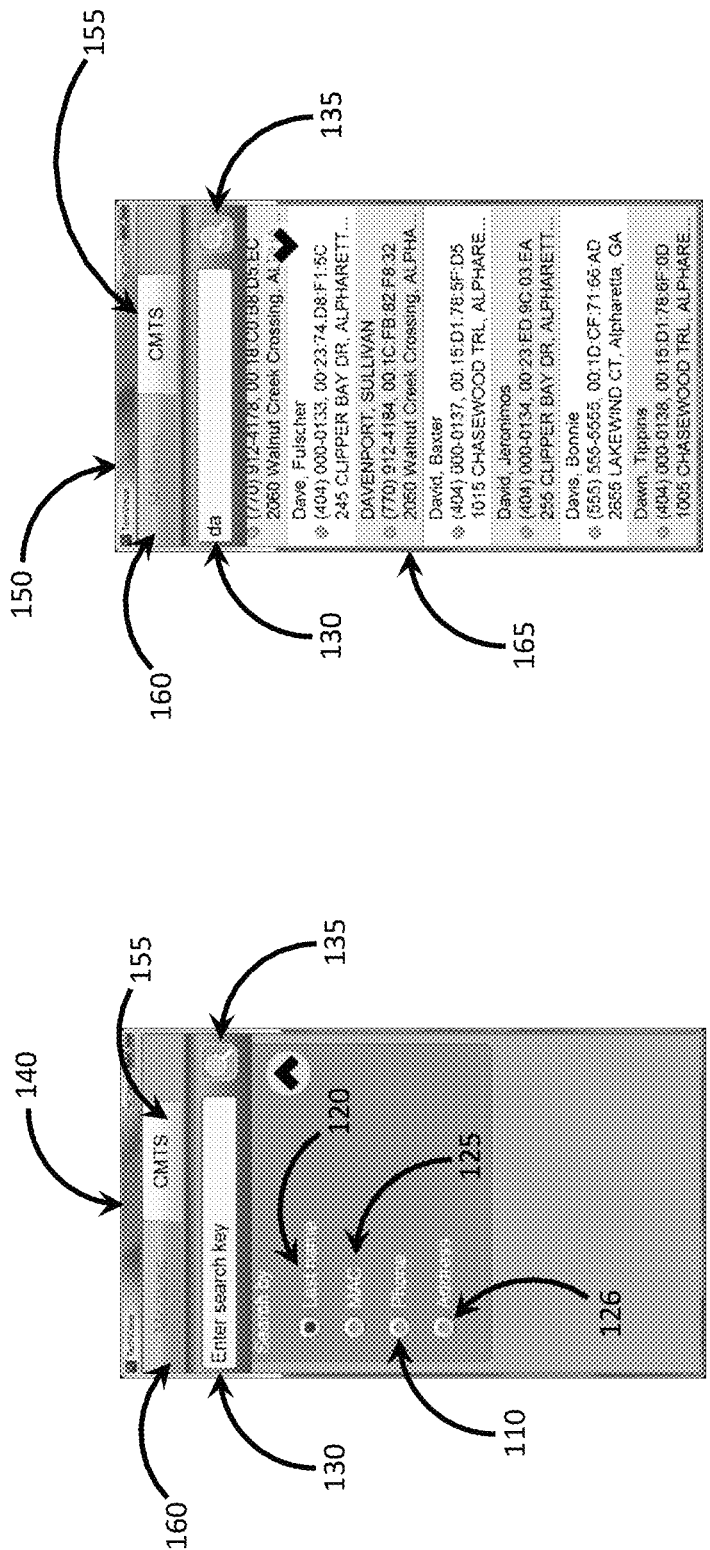
FIG. 1B illustrates an exemplary mobile device Search Options Screen.

Operation of the mobile device search options will now be described with respect to FIG. 1B. The screen shots 140 and 150 shown in FIG. 1B are representations of how the search screens will appear on a client device, such as a portable smart device such as a smartphone or tablet. With respect to the tablet type devices, the screen shots will naturally be larger, but the information provided will be consistent with information presented in FIG. 1B. As can be seen, the tester will typically be presented with a standard search option screen 140. The standard search screen 140 allows the tester to search by a limited set of search criteria. In the embodiment of FIG. 1B for example, search criteria includes phone 110, last name 120, MAC address 125 and physical address 126 radio buttons. The tester may select a desired search option by engaging one of the radio buttons 110, 120, 125 or 126 and then inputting the specific search criteria into the provided search input field 130. The search may be initiated when the tester engages a search button 135 or by other input. Once the tester initiates the search 135, the tester is presented with screen 150. As can be seen, the results of the search 165 are presented with reference to the criteria entered 130. Searches can be performed for modems 160 and other network elements 155 within the mobile search screens.

Advanced Search Options

Figure 2:
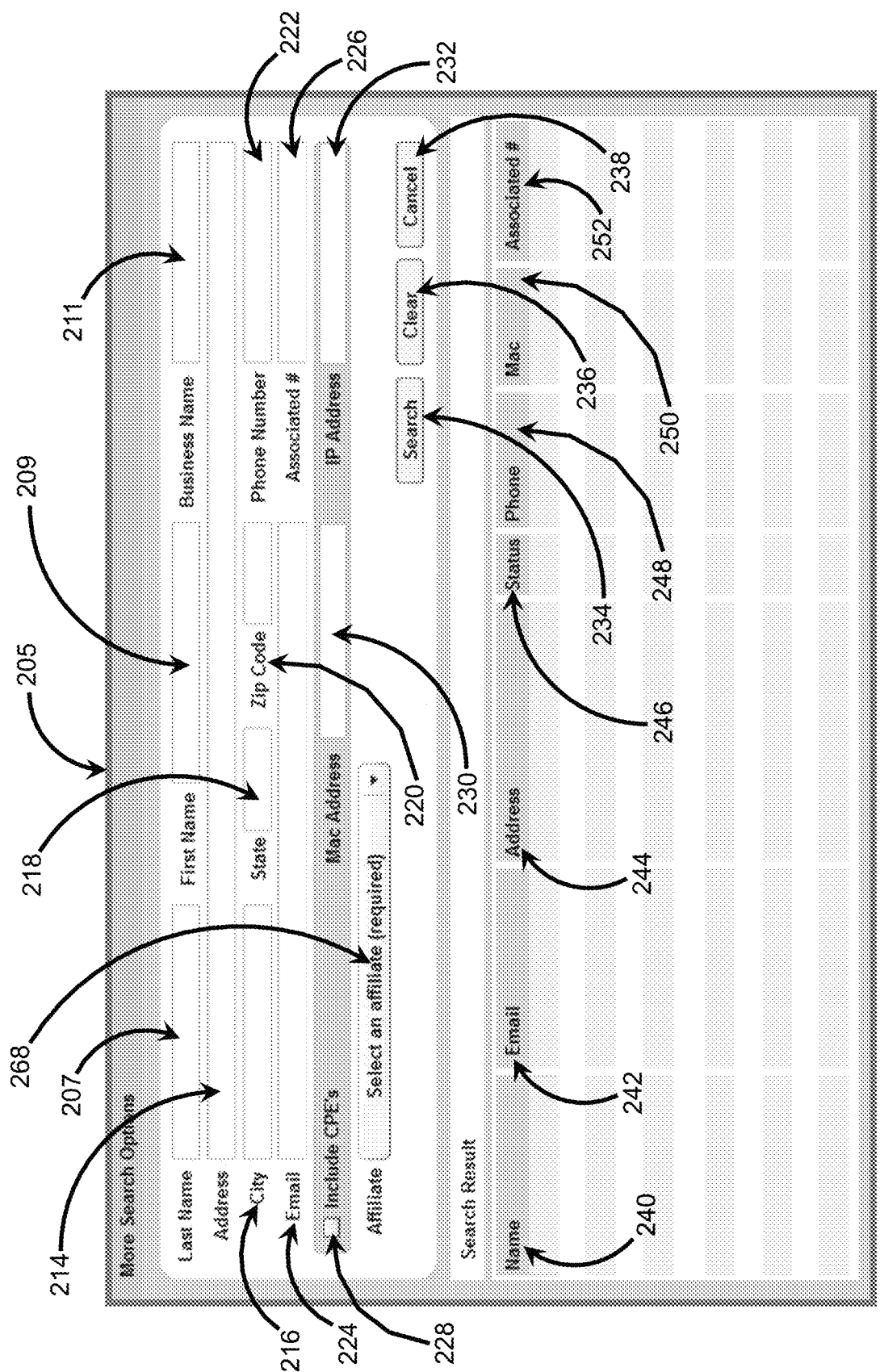
FIG. 2 illustrates an exemplary Advanced Search Options screen.

Advanced Search Options will now be described with reference to FIG. 2. As can be seen, an advanced search option screen 205 typically includes far more detailed criteria and information than the search options screen depicted in FIG. 1A. The advanced search option screen 205 allows the tester to provide user input (i.e., search criteria) including last name 207, first name 209, business name 211, address 214, city 216, state 218, zip code 220, phone number 222, email address 224, and the (associated #) account number of the client 226 via corresponding input fields. Any of the information in these sections can be entered and searched in any order or priority. Naturally it is assumed that the more detailed information provided, the better granularity the search results will provide.

The system also provides a check box 228 that allows the tester to search by a MAC address 230 of the equipment being searched, an IP address 232, or both. These search criteria can be added and used in any combination with the aforementioned search criteria 207 through 226. Once the search criteria has been entered into the advanced search screen 205, the tester can either engage a search button 234 to initiate or execute a search, a clear button 236 which would delete the data entered into each input field, or a cancel button 238 which would abandon the advance search and return the tester to the home screen.

Once the tester executes a search, the results will appear below in a search result area. Results provided may include the customer name 240, email address 242, physical address 244, a status indicator 246 showing the online status of the customer's network, the customer's phone number 248, the MAC address 250 associated with the customer's modem, and the account number 252 (also referred to as the associated #). The status indication 246 may appear as a red, yellow or green led type or other symbol/icon indicating the status of the customer's network.

Diagnostic Screen Refresh Rate

The broadband diagnostics system provides the capability of automatically refreshing the diagnostic screens for the purpose of updating the information to track changes in the signal levels, frequencies, signal to noise ratios and other vital diagnostic information. The screen refresh rate is preset to occur once every 60 seconds. While this preset is selected as an example of the capability of the system, it is not limited to 60 seconds. This timeframe can be expanded or contracted as desired to suit the needs of the system and the network elements being diagnosed. Additionally, each screen has the capability of being manually refreshed at any time by the tester. The diagnostic screen refresh rate can be enabled and disabled by a variety of actuations, including (but not limited to) radio button(s), check boxes, manual commands and other toggle methodologies.

Viewing of Bonded Channels in DOCSIS 3.x Modems

The broadband diagnostics system also allows the tester to view the individual channel information associated with bonded channels in DOCSIS 3.x certified cable signals. DOCSIS is an acronym for "Data Over Cable Service Interface Specification", which is the standard used by cable providers in the United States to define signal transmission specifications for cable networks and their associated devices (including cable modems). The broadband diagnostics system provides a method for allowing the tester to view bonded channels that comply with this specification.

In operation, various diagnostic information may be received by the broadband diagnostics system, such as from demarcation devices (e.g., cable or DSL modems). The broadband diagnostics system may transmit a request or other signal to a demarcation device to request such diagnostic information. Though the following is described with respect to bonded channels, it is noted that the broadband diagnostics system may allow individual channels to be viewed and compared for diagnostic purposes in the same manner.

Figure 3A:
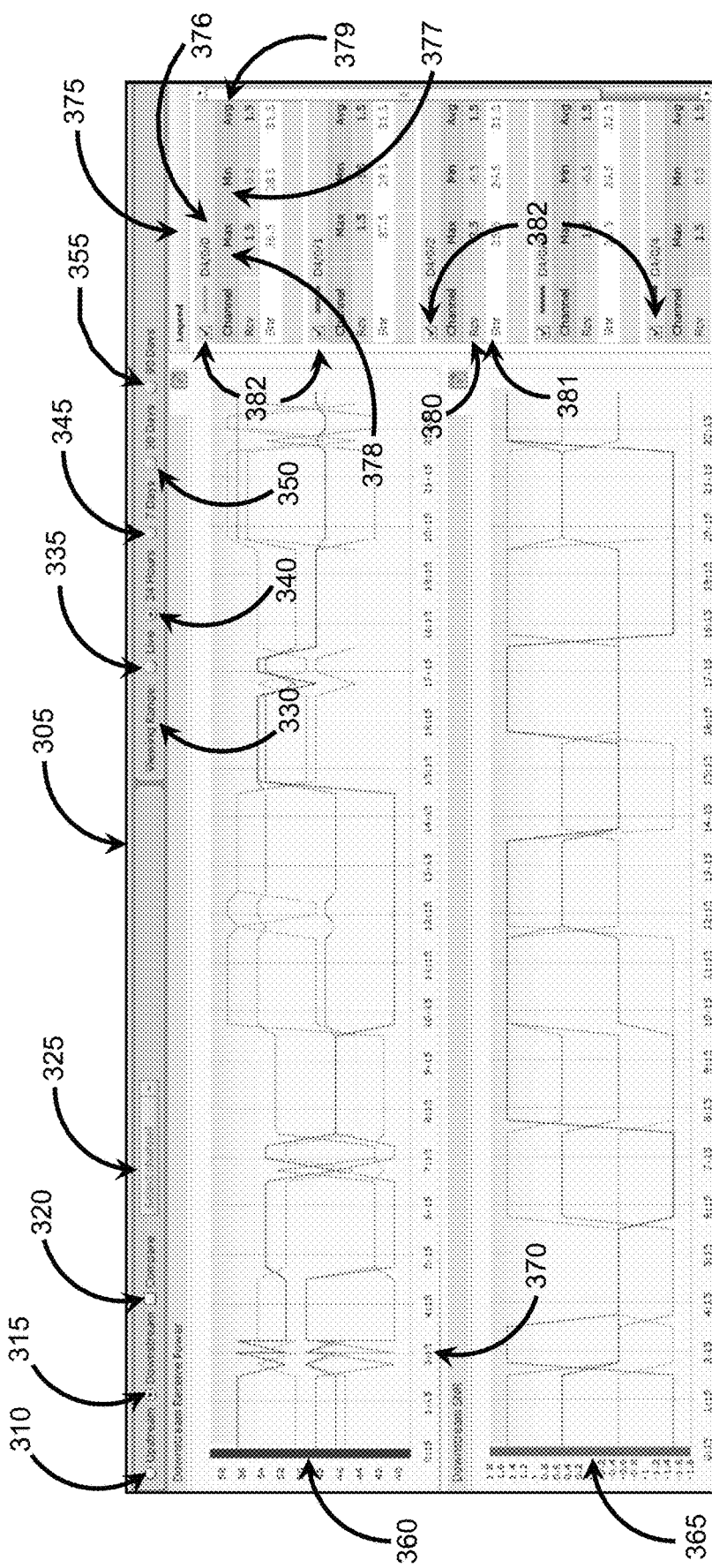
FIG. 3A shows an exemplary bonded channel identification screen illustrating the bonded channel view for the downstream receive direction of the signal.

Operation of bonded channel identification and reporting will now be described with reference to FIG. 3A. FIG. 3A illustrates an exemplary bonded channel identification screen 305 showing diagnostic information in the form of signal levels across a period of time. As can be seen, the tester has the option to select the upstream 310 or the downstream 315 direction of the bonded signal for viewing. In this representation, the downstream 315 direction of the bonded signal is selected and shown. The tester also has the option of comparing signal levels by actuating the compare check box 320, or selecting the individual channel of the bonded signal they wish to view by actuating the pull down menu 325 and selecting the desired channel. A comparison will typically overlay multiple bonded signals for viewing and comparison to one another. Both live RF data 335 and historical RF data 340, 345, 350 and 355 can be viewed from this screen by actuating the desired timeframe from the viewing range menu 330.

From the viewing range menu 330, the tester can select a live signal 335, to track current signal levels, a 24 hour view 340, that shows all signal information over the last 24 hours, a 7 day view 345 that shows all activities for the last week, a 30 day view 350 and a 90 day view 355. While the system is capable of further granularity in reference to both live and historical data, the timeframes represented in the viewing range 330 were chosen to make it easier to explain the functionality.

A graphical representation 360 of each of the individual channels within the bonded channel group is provided to give a visual indication of the behavior of each signal within the group. The signal to noise ratio 365 is also represented graphically, to give detailed behavioral information about each channel within the bonded group. One or more time stamps 370 may be provided to allow the tester a representation of the time in which the behavior of the signal level being tracked occurred. The time stamps 370 are typically relative to the viewing range 330 selected by the tester.

A legend 375 may be provided to give a snapshot of each of the individual channels within the bonded group. The legend 375 provides information about each channel, including the channel number 376, the minimum 377 and maximum 378 levels the signals have achieved, as well as an average 379 of the signal level over the period. This information is provided (in this example) for the receive signal 380 and the signal to noise ratio 381.

Since the bonded channel identification screen 305 is specifically tracking the downstream 315 direction of the signal, only these signals are referenced in the legend 375. Should a tester choose to view the upstream signal 310, or compare the signals, all appropriate levels would be displayed in both the legend and the bonded channel references 360, 365. To provide further diagnostics capabilities, the system allows a tester to select or deselect a channel 382 to be displayed. This is accomplished by simply actuating a checkbox 382 provided in the legend 375. Channels selected will be displayed in both the legend 375 and the associated bonded channel reference graphs 360 and 365. Deselected channels will typically not be displayed.

Figure 3B:
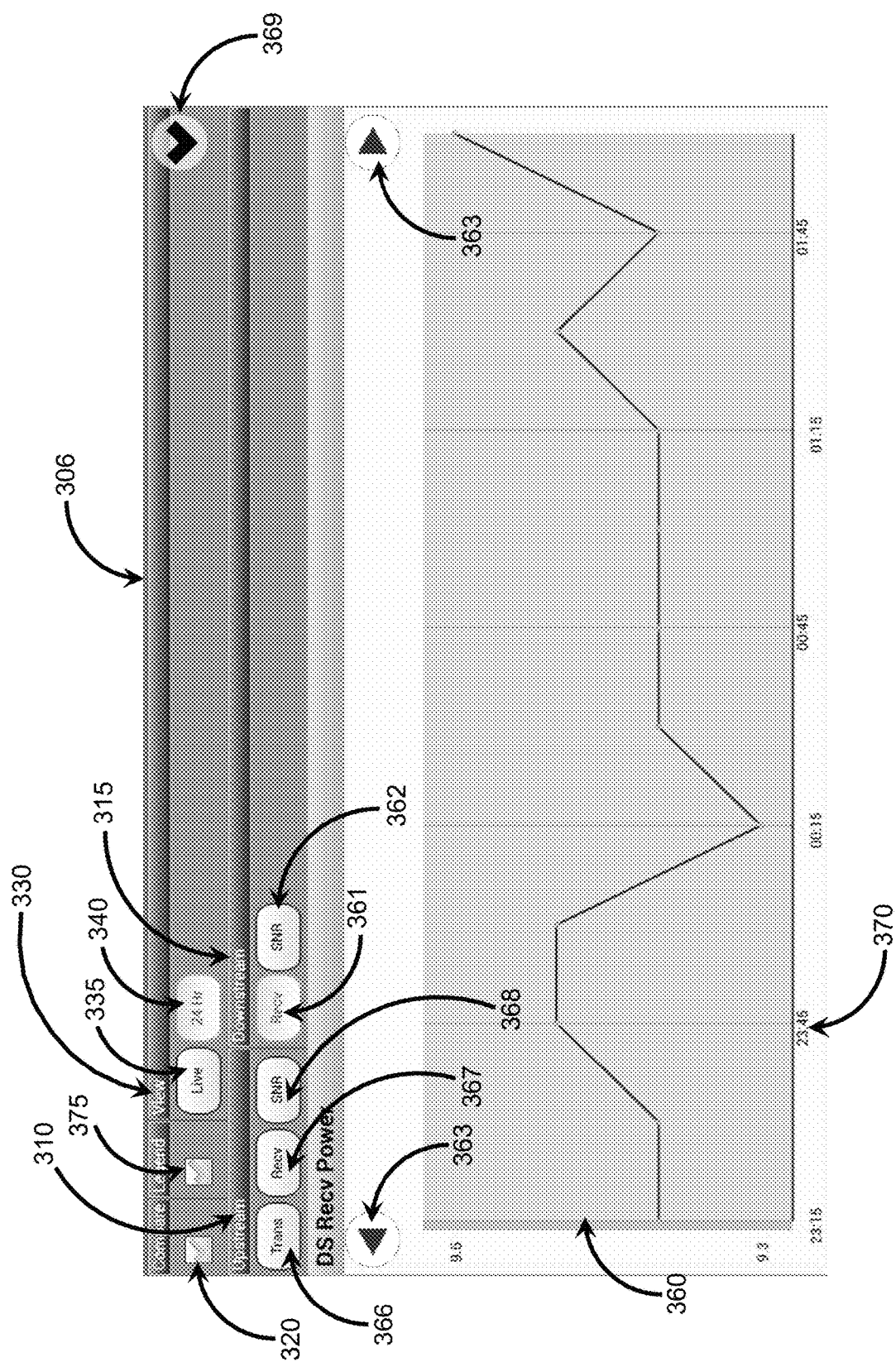
FIG. 3B shows an exemplary bonded channel identification mobile device screen illustrating the bonded channel view for the downstream receive direction of the signal.

Operation of bonded channel identification and reporting for mobile devices will now be described with reference to FIG. 3B. It is important to note that due to the limited size of the viewing window associated with portable smart devices (like smartphones and tablets), some of the functionality has been redistributed to other areas of the software to allow better viewing of the specific functional aspects associated with the test being performed. FIG. 3B illustrates an exemplary bonded channel identification screen 306. As can be seen, the tester has the option to select the upstream 310 or the downstream 315 direction of the bonded signal for viewing. In this representation, the downstream 315 direction of the bonded signal is shown. The tester also has the option of comparing signal levels by actuating the compare check box 320. Both live RF data 335 and historical RF data 340 can be viewed from this screen by actuating the desired timeframe from 335 or 340. From the viewing range menu 330, the tester can select a live signal 335, to track current signal levels, or a 24-hour view 340, that shows all signal information over the last 24 hours. While the system is capable of further granularity in reference to both live and historical data, the timeframes represented in the viewing range 330 were chosen to make it easier to explain the functionality.

A graphical representation 360 of each of the individual channels within the bonded channel group is provided to give a visual indication of the behavior of each signal within the group. With reference to FIG. 3B, there is only one signal 360 present in the screen capture 306. Should other channels be available within the bonded group in this screen capture 306, they would be displayed here 360. The downstream receive signal to noise ratio 362 can be graphically represented 360 by actuating the SNR radio button 362. This will provide detailed behavioral information about each channel within the bonded group. One or more stamps 370 may be provided to allow the tester a representation of the time in which the behavior of the signal level being tracked occurred. The time stamps 370 are typically relative to the viewing range 330 selected by the tester. Scroll-type radio buttons 363 are provided to allow the tester to navigate to a specific timeframe 370 in order to view specific criteria associated with the test being performed.

A legend 375 may be provided to give a snapshot of each of the individual channels within the bonded group. For portable devices, the legend can be activated by selecting the check box 375. Once activated, the legend 375 provides information about each channel.

Since the bonded channel identification screen 306 is specifically tracking the downstream 315 direction of the signal, only these signals are referenced in the legend 375. Should a tester choose to view the upstream signal 310, or compare the signals 320, all appropriate levels would be displayed in both the legend 375 and the bonded channel references 360. As can be seen. Any portion of any available signal can be accessed from the screen 306 by selecting the upstream 310 or downstream 315 signal to be viewed. These include the upstream transmit 366, receive 367 and signal to noise ratio 368. For the downstream 315 direction, receive 361 and signal to noise ratio 362 information can be viewed. A pull-down menu 369 is provided to allow the tester to navigate to other menus within the portable device broadband diagnostics software.

Figure 4A:
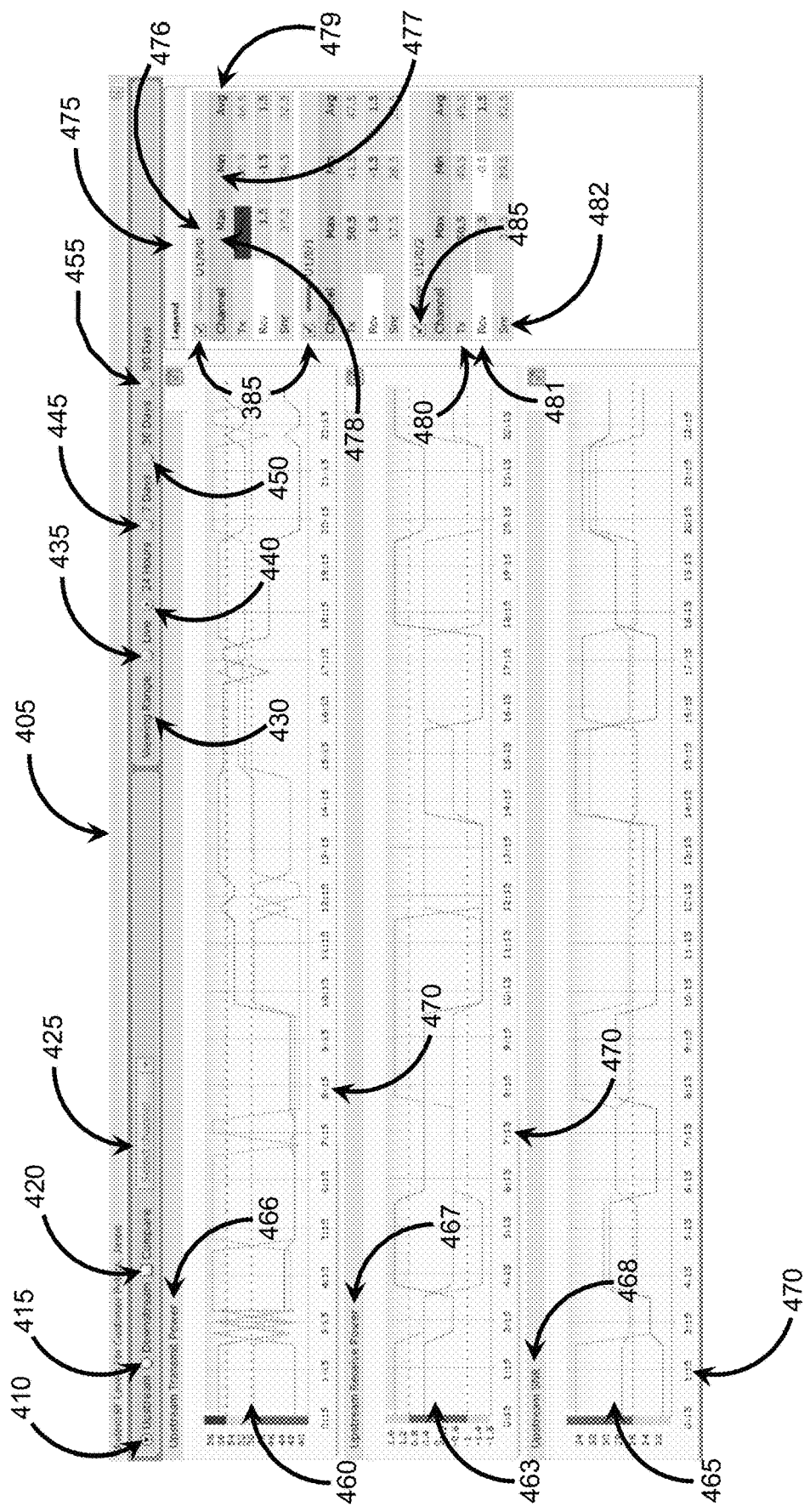
FIG. 4A shows an exemplary RF Level screen illustrating the bonded channel view for the upstream transmit direction of the signal.

FIG. 4A illustrates an exemplary RF Level screen 405 showing diagnostic information comprising the upstream 410 signals within the bonded channel groups 460, 463, 465. The upstream 410 signals are shown along with reference diagnostic information, namely upstream transmit power 466, the upstream receive power 467 and upstream signal to noise ratio 468 being displayed. It is noted that various other signal levels may be presented as reference diagnostic information for comparison purposes. Within each group, the individual channels within the bonded groups 460, 463, 465 are shown. In addition to the upstream direction 410 being displayed, the tester has the option of viewing the downstream direction 415, or comparing the signals 420, displaying both the upstream 410 and the downstream 415 signals.

Similar to the bonded channel identification screen of FIGS. 3A-3B, the tester can select individual channels 425 by actuating the pull down menu and selecting the channel to be viewed. The viewing range 430 provides further historical information about the bonded signals being viewed. The tester can choose to view the signal live 435, or choose to view historical data about the bonded signal. For the purpose of this example, the available historical viewing choices provided are 24 hours 440, 7 days 445, 30 days 450 and 90 days 455.

In addition, each of the individual channels within a bonded grouping 460, 463, 465 are typically displayed with reference to their signal direction 466, 467, 468 and their incremental timestamp data 470. Granularity of the timestamp data 470 is governed by the selections performed within the viewing range menu 430. While the system is capable of further granularity for both live and historical data, these selections were chosen to ease explanation and understanding of the function of the system. A legend 475 is provided to show a summary of the individual channel data being monitored. The legend 475 provides a channel identification 476, the minimum signal level 477 and maximum signal level 478 experienced during the period, and an average 479 of the signal level during the period. Each channel 476 within the legend 475 provides the signal level references discussed for the transmit 480, receive 481 and the signal to noise ratio 482 of a channel or signal. A tester may choose to add or remove channels from the view by selecting or deselecting the check box 485 provided for the given channel.

Figure 4B:
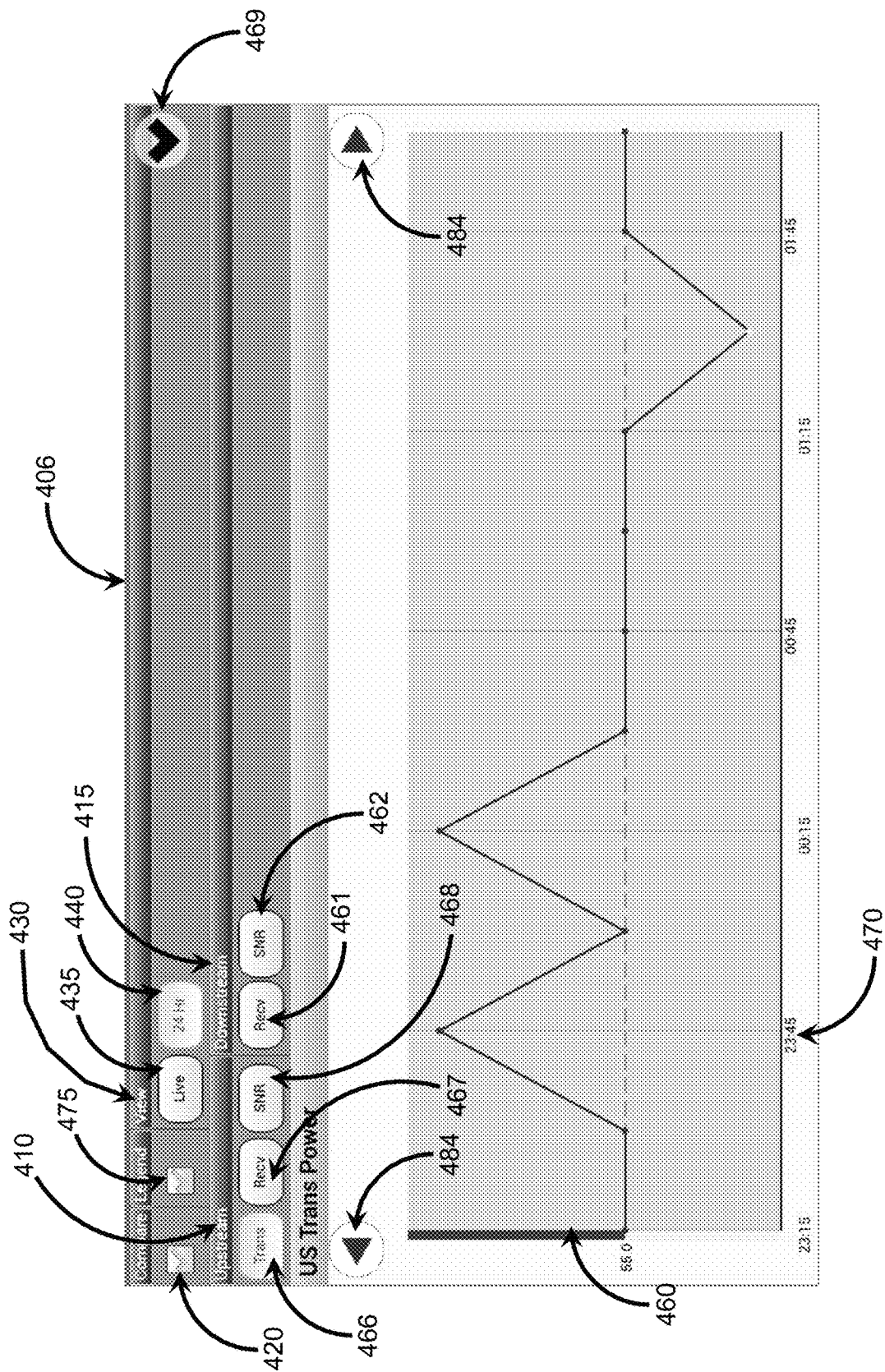
FIG. 4B shows an exemplary mobile device RF Level screen illustrating the bonded channel view for the upstream transmit direction of the signal.

FIG. 4B illustrates an exemplary mobile device RF Level screen 406 showing diagnostic information comprising upstream 410 transmit signals within the bonded channel group 460. The upstream 410 signals are shown with reference to the upstream transmit power 466. Since the viewing area on portable devices is limited, the broadband diagnostics system provides radio buttons to change the viewing attributes for the signal or signals being diagnosed. Specifically, the radio button 467 is provided to see a receive upstream signal. The signal to noise ratio can be seen by activating the radio button 468. For viewing the downstream 415 signals, the radio button 461 is provided for the receive signal, while 462 is provided for the signal to noise ratio signaling. Within each group, the individual channels within the bonded groups 460 are shown. In addition to the upstream direction 410 being displayed, the tester has the option of viewing the downstream direction 415, or comparing the signals 420, displaying both the upstream 410 and the downstream 415 signals.

The viewing range 430 provides further historical information about the bonded signals being viewed. The tester can choose to view the signal live 435, or choose to view historical data about the bonded signal. For the purpose of this example, the available historical viewing choice is limited to 24 hours 440.

In addition, each of the individual channels within a bonded grouping 460 are typically displayed with reference to their signal type 461, 462, 466, 467, 468 and their incremental timestamp data 470. Granularity of the timestamp data 470 is governed by the selections performed within the viewing range menu 430. While the system is capable of further granularity for both live and historical data, these selections were chosen to ease explanation and understanding of the function of the system. A legend 475 is provided to show a summary of the individual channel data being monitored. The legend 475 provides a channel identification, the minimum signal level and maximum signal level experienced during the period, and an average of the signal level during the period. Scroll-type radio buttons 484 are provided to allow the tester to navigate to a specific timeframe 470 in order to view specific criteria associated with the test being performed.

Figure 5A:
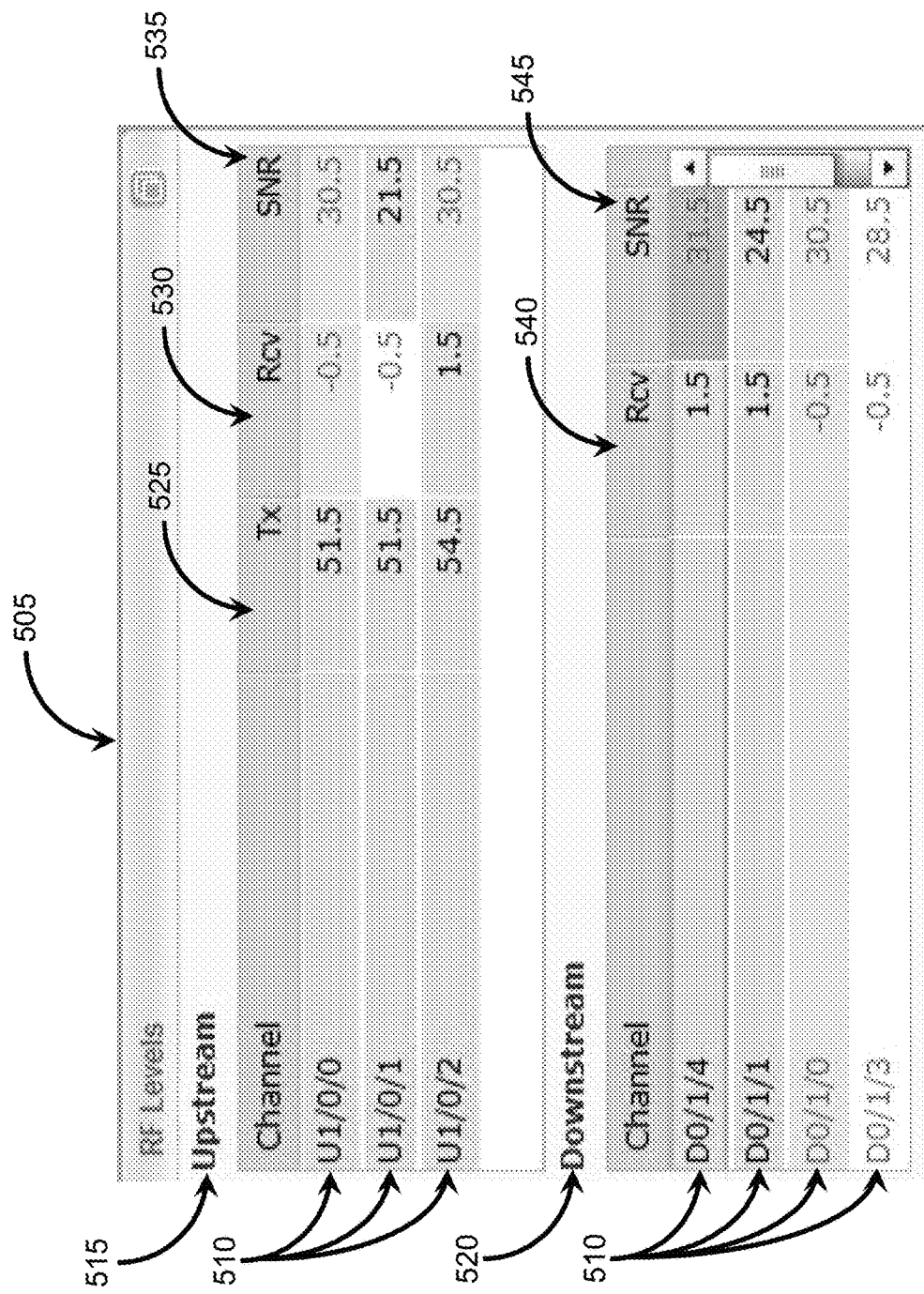
FIG. 5A shows an exemplary RF Level screen provided to summarize all of the upstream and downstream channel information.

Diagnostic information may be presented in various other ways. For instance, FIG. 5A illustrates an exemplary RF Level summary screen that aggregates all the diagnostic information provided in the bonded identification screen of FIGS. 3A-3B and in the RF Level screens of FIG. 4A-4B to present a simplified view of the data. As can be seen, the system provides a RF Level screen 505 displaying individual channel information 510 pertaining to each channel within the bonded channel grouping. Signal level information gathered about the individual channels within each group is displayed in both the upstream direction 515 and downstream direction 520. For all channels 510 in the upstream direction 515, the RF level summary 505 provides signal level information for the transmit signals 525, the receive signal level 530 and the signal to noise ratio 535. Likewise, the downstream channel information 520 is also displayed. For each of the downstream channels 520, the receive signal level 540 and the signal to noise ratio 545 is displayed.

Figure 5B:
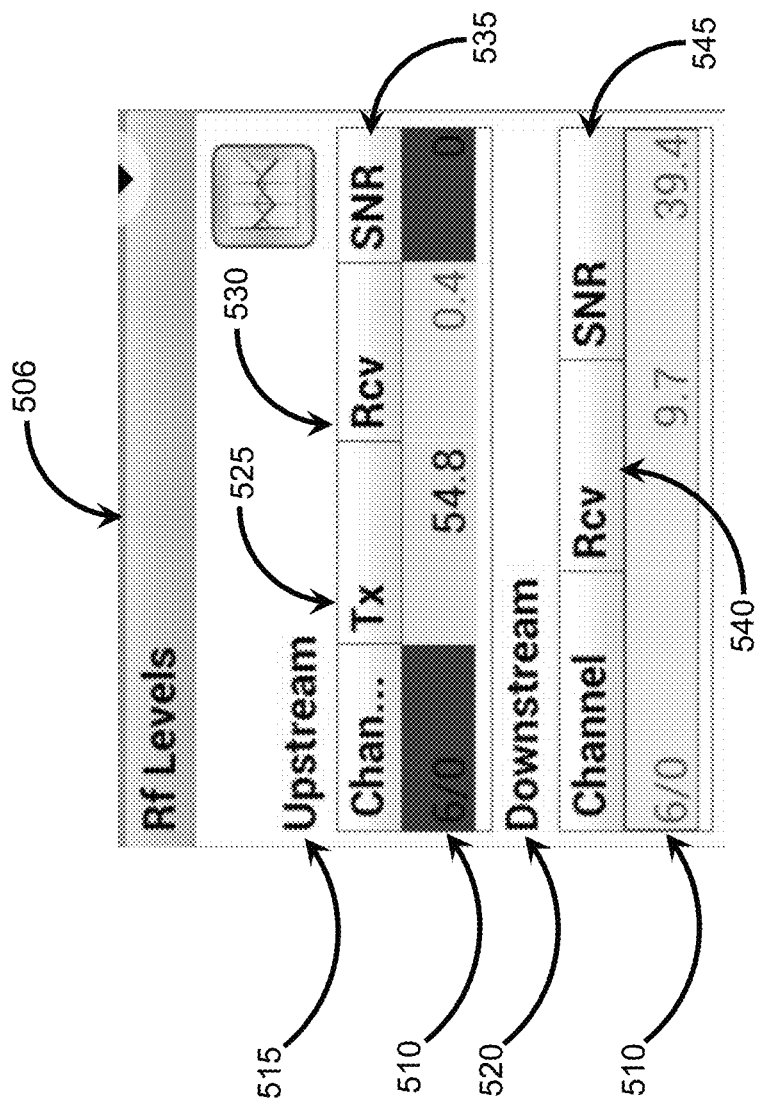
FIG. 5B shows an exemplary mobile device RF Level screen provided to summarize all of the upstream and downstream channel information.

FIG. 5B illustrates another exemplary mobile device RF Level summary screen that aggregates all the information provided in the bonded identification screen of FIG. 3B and FIG. 4B to present a simplified view of the data. As can be seen, the system provides a RF Level screen 506 displaying individual channel information 510 pertaining to each channel within the bonded channel grouping. Signal level information gathered about the individual channels within each group is displayed in both the upstream direction 515 and downstream direction 520. For all channels 510 in the upstream direction 515, the RF level summary 506 provides signal level information for the transmit signals 525, the receive signal level 530 and the signal to noise ratio 535. Likewise, the downstream channel information 520 is also displayed. For each of the downstream channels 510, the receive signal level 540 and the signal to noise ratio 545 is displayed.

Visibility to Customer Premises Equipment

In addition to being able to identify and diagnose networks and their associated network elements, the broadband diagnostics system herein allows a tester to view and identify equipment that is deployed beyond the demarcation point (i.e., customer premises equipment). In one or more embodiments, various network discovery protocols may be used to identify networks and the customer premises equipment thereon for diagnostic purposes. For example, customer premises equipment may be identified by their model, make or both. Additional information such as equipment serial numbers may be retrieved as well. It is noted that demarcation devices may also be identified in the same manner.

For the purpose of this discussion, it is assumed that the demarcation point/device of the network is the cable or xDSL modem, where the signals generated from the provider's network are handed off to the customer utilizing the service. While the broadband diagnostics system is capable of testing and troubleshooting networks for both xDSL and cable facilities and modems, FIG. 6A will focus on the cable facility and associated network and customer premises equipment. This is to ensure ease of explanation and understanding of the functionality being disclosed.

Figure 6A:
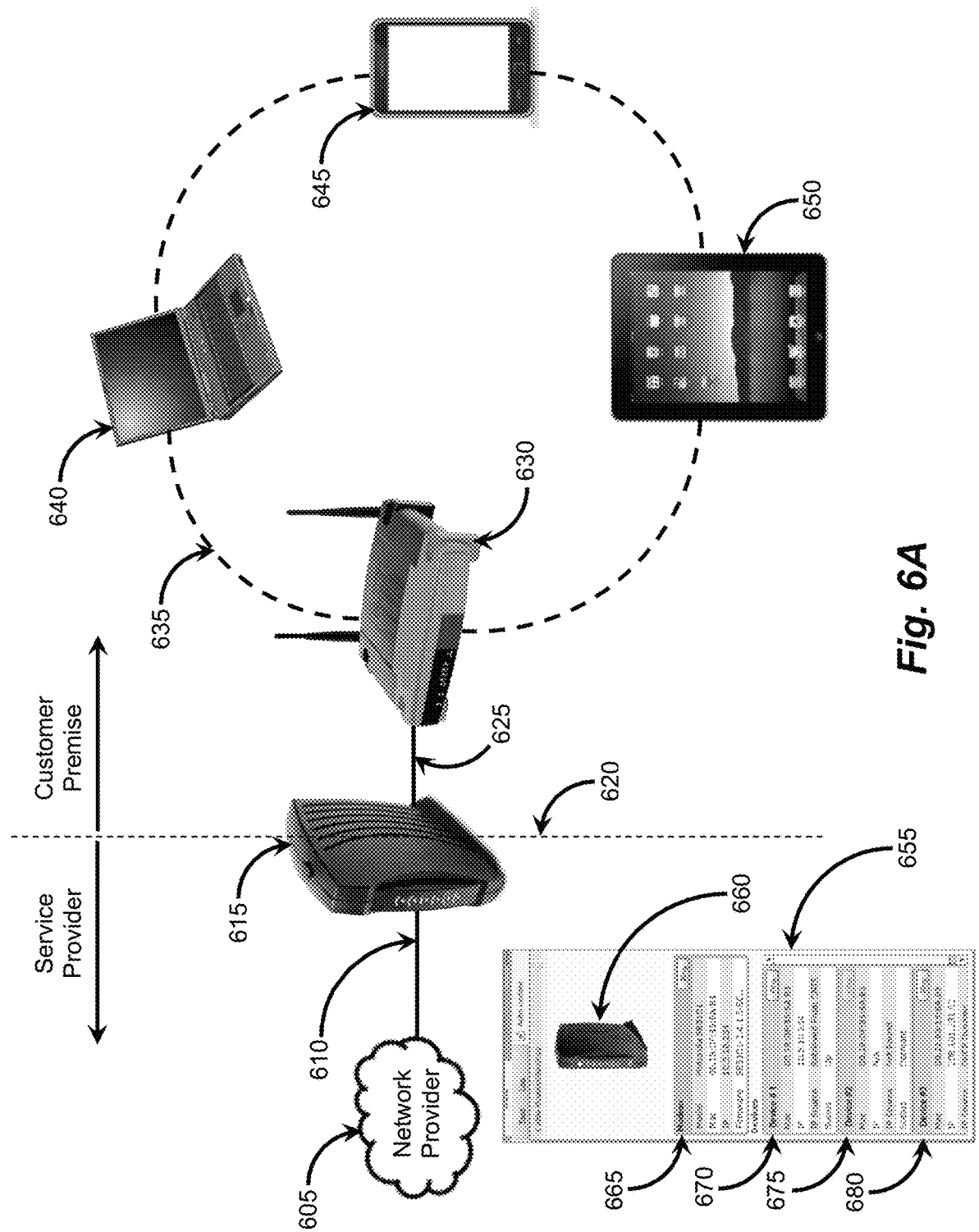
FIG. 6A illustrates an exemplary network in which a testing system can test, troubleshoot and identify network elements that exist on the customer premises.

The function of allowing visibility to customer premises equipment will now be described with reference to FIG. 6A. FIG. 6A is a block diagram illustrating a typical network containing one or more network elements. These include the network provider 605 where the signals originate, the cable facility 610 that the broadband signal travels through, the cable modem 615 that serves as the demarcation device between the network and the customer premises equipment, the ethernet or coaxial cable 625 on the customers premises, a wired and/or wireless router 630, a wired or wireless local area network 635, and a variety of customer premises equipment. Customer premises equipment devices can include (but are not limited to) any number of personal computers 640, smartphones 645, tablets and/or pads 650, and other typical customer devices.

For the purpose of this explanation, it is assumed that the broadband diagnostics system is accessing the network from the network provider 605. A reference screen 655 is present within the broadband diagnostics system that provides detailed information about the customer's network and their associated equipment. This information may include (but is not limited to) a graphical representation 660 of the customer's modem, the actual address information about the device 665 itself, and information about any additional devices 670, 675, 680 within the customer's network. The device information displayed may include MAC addresses, IP addresses, model numbers, equipment type identifiers, and other information specific to the element being viewed.

Figure 6B:
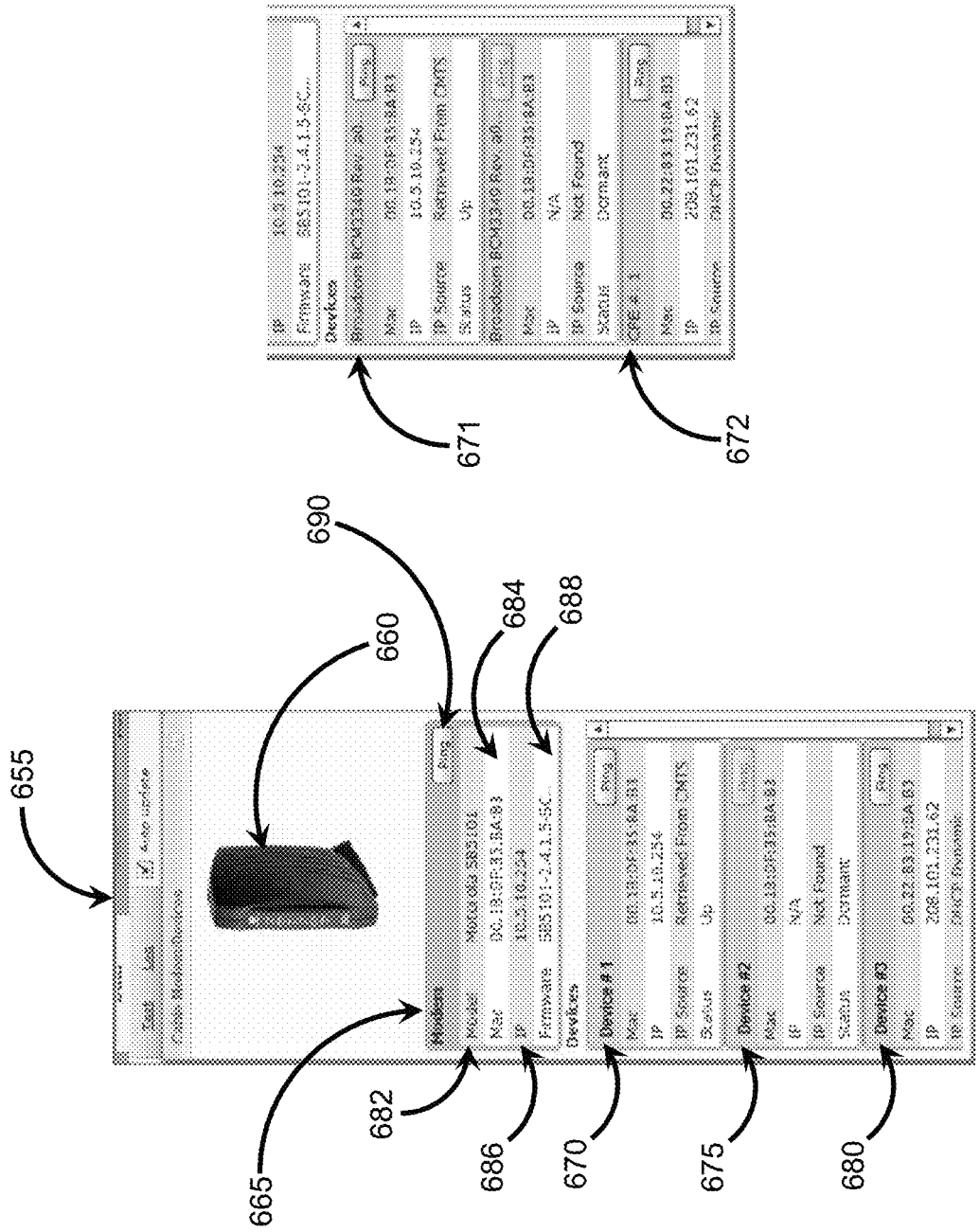
FIG. 6B illustrates an exemplary reference screen identifying the elements that exist at a customer's premises.

FIG. 6B provides detailed information about the reference screen 655 in which the information about customer premises equipment is displayed. As can be seen, the first device 660 may be pictured at the top of the reference screen 655. The first device 660 displayed in this case is a modem. Devices and pictures represented will vary by type and are not limited to any specific order of appearance. Directly below the device image 660 is a device identification area 665 of the reference screen 655 designated to provide details specific to the device 660 being identified. Information provided in the device identification area 665 may include the model number of the device 682 specified, the MAC address 684 of the device, the IP address 686 of the device, and the firmware revision 688 of the device. Other information and identifiers for the device may also be displayed.

In addition to the information displayed in the device identification area 665 of the screen, a button 690 is also provided to allow the tester to send a signal to the device, commonly referred to as a ping, to allow the tester to determine if the device is actively communicating with the network and associated elements. The tester can actuate the button 690 to send the ping signal to the device specified. If the device is online and capable of responding, the response to the ping will be displayed. While the button 690 is identified in this representation as a push-type button, it could take other forms, including a radio button, check box or other manifestation indicating the capability to actuate the function.

It is contemplated that for each device identified by the broadband diagnostics system (such as device 660), a specific area designated to providing information about the device (like the device identification area 665) may be provided. This is shown in FIGS. 6A-6B in areas 670, 675 and 680. The device name, type or other identifier 671 may be displayed, indicating the specific name and/or brand of the device, depending on the device type and its associated imbedded identification information. Such identifiers can include revision levels of the firmware imbedded in the device, issue dates, time stamps and other imbedded device identification. In instances where the device type is not identified, a generic identifier may be used to allow the tester to collect, store and display information about the device. Generic identifiers can include terms like "device #1", 672 "CUSTOMER PREMISES EQUIPMENT #1" or one or more other identifiers.

While the reference screen 655 shown in FIG. 6A provides for only four device types, the number of devices displayed can vary. If the tester has more or less than the four devices shown in a reference screen 655, the reference screen will reflect them accordingly. It is important to note that only devices that are connected to the network and are actively communicating with the network can be identified.

Figure 6C:
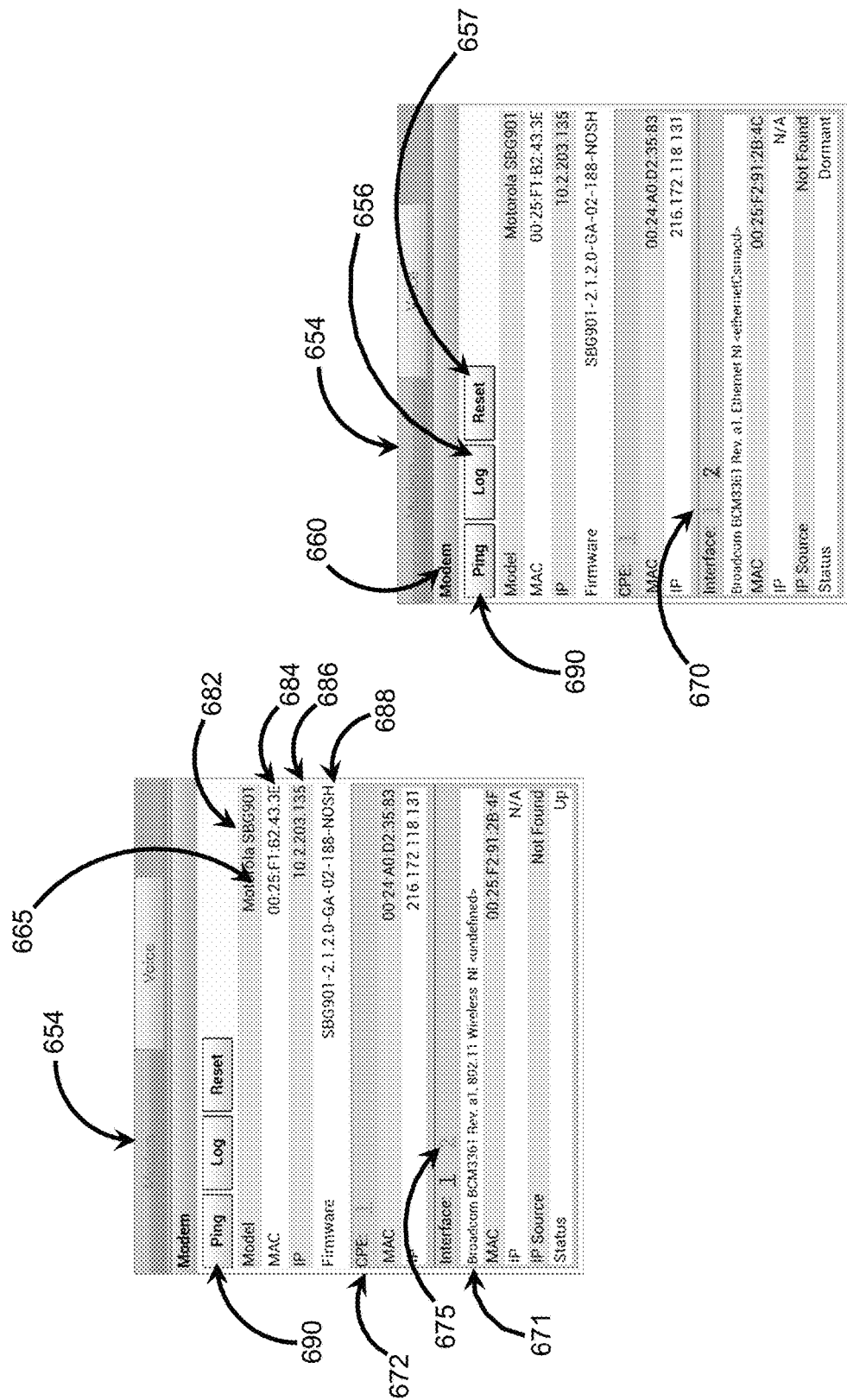
FIG. 6C illustrates an exemplary mobile device reference screen identifying the elements that exist at a customer's premises.

FIG. 6C provides detailed information about the mobile device reference screen 654 in which the information about customer premises equipment is displayed. The first device 660 displayed in this screen 654 is a modem 660, with its model identification 682 also represented. Devices represented will vary by type and are not limited to any specific order of appearance. Directly below the device 660 is a device identification area 665 of the reference screen 654 designated to provide details specific to the device 660 being identified. Information provided in the device identification area 665 may include the model number of the device 682 specified, the MAC address 684 of the device, the IP address 686 of the device, and the firmware revision 688 of the device. Other information and identifiers for the device may also be displayed.

In addition to the information displayed in the device identification area 665 of the screen, a button 690 is also provided to allow the tester to send a signal to the device, commonly referred to as a ping, to allow the tester to determine if the device is actively communicating with the network and associated elements. The tester can actuate the button 690 to send the ping signal to the device specified. If the device is online and capable of responding, the response to the ping will be displayed. While the button 690 is identified in this representation as a push-type button, it could take other forms, including a radio button, check box or other manifestation indicating the capability to actuate the function.

It is contemplated that for each device identified by the broadband diagnostics system (such as device 660), a specific area designated to providing information about the device (like the device identification area 665) may be provided. This is shown in FIGS. 6A-6B as areas 670, 675 and 680, and in FIG. 6C as areas 670 and 675. The device name, type or other identifier 671 may be displayed, indicating the specific name and/or brand of the device, depending on the device type and its associated imbedded identification information. Such identifiers can include revision levels of the firmware imbedded in the device, issue dates, time stamps and other imbedded device identification. In instances where the device type is not identified, a generic identifier may be used to allow the tester to collect, store and display information about the device. Generic identifiers can include terms like "device #1", 672 "CUSTOMER PREMISES EQUIPMENT #1" or other generic identifier.

While the reference screen 654 shown in FIG. 6C provides for only two device types, the number of devices displayed can vary. If the tester has more or less than the two devices shown in a reference screen 654, the reference screen will reflect them accordingly. It is important to note that only devices that are connected to the network and are actively communicating with the network can be identified.

Detailed RF Display Data (RF Drill-In)

The broadband diagnostics system may also provide detailed information about the devices being tested. This information is aggregated and displayed in an enhanced RF Level display window referred to as "RF Drill-In", as can be seen from FIG. 7A. In this display, the tester can see detailed information about a single network element, or multiple elements simultaneously. Further, the tester can recall historical information stored within the system, and compare it with real-time information being collected about the network and/or element being tested. The RF Drill-In display may allow the tester to select various viewing ranges including "live", "24 hours", "7 days", "30 days" and "90 days". While the system allows for further granularity, we will limit this example to the above referenced ranges to ease explanation and understanding of the functionality of the system.

Figure 7A:
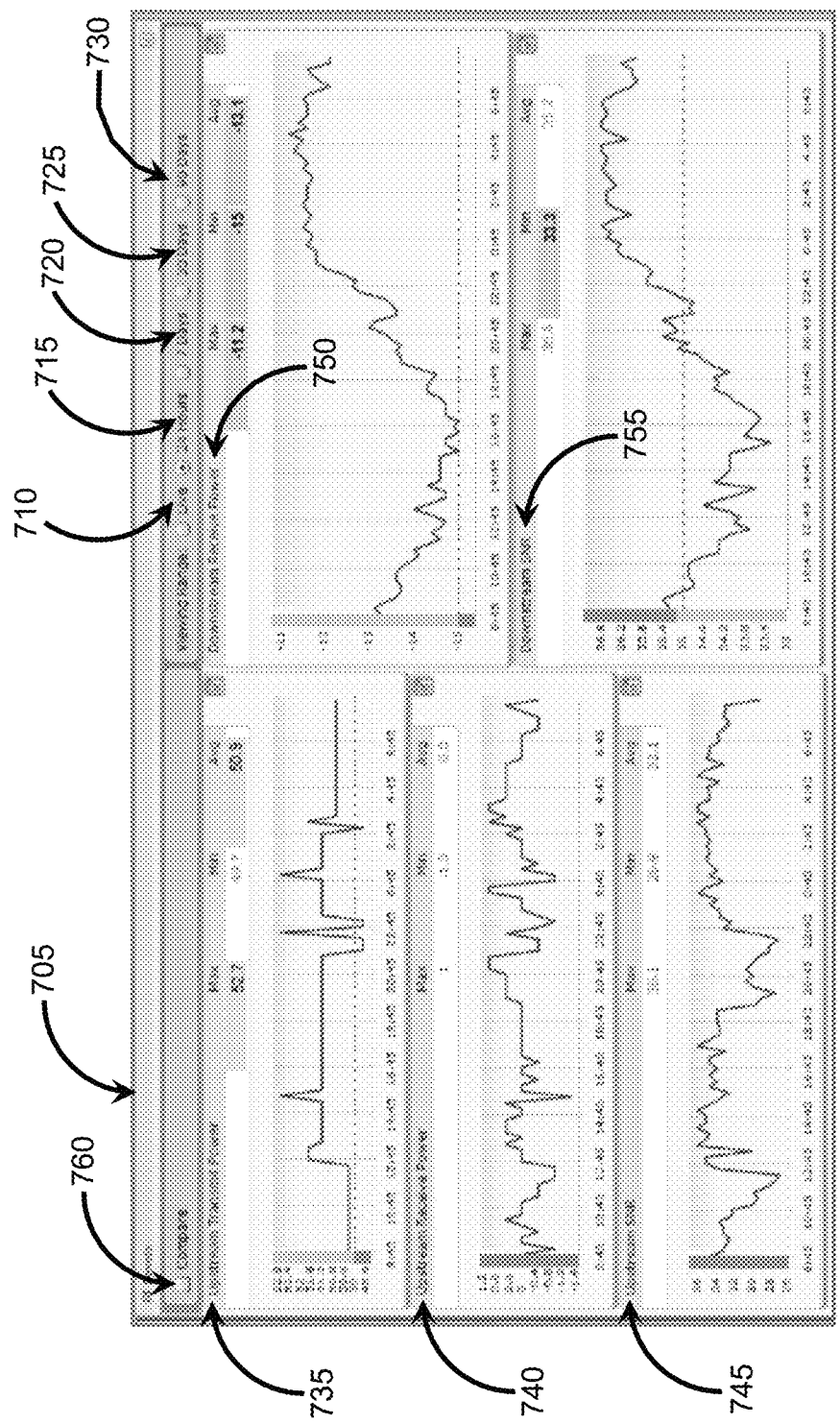
FIG. 7A illustrates an exemplary RF Drill-In screen allowing identification of signal sources and levels.

Details regarding RF Drill-in will now be described with reference to FIG. 7A. FIG. 7A illustrates an enhanced RF display or RF-Drill-In screen 705. As can be seen in the RF-Drill-In screen 705, a tester may select multiple timeframes for viewing historical data pertaining to the network and/or network elements being tested. These timeframes include live 710, which is a real-time display of network activities happening now, 24-hours 715 which provides a 24 hour view of the network activities, 7 days 720, 30 days 725, and 90 days 730. While the broadband diagnostics system can be configured for virtually any timeframe for reviewing historical data, the timeframes 710-730 above were chosen for ease of explanation.

In conjunction with the timeframes 710-730 that can be selected for viewing, the RF Drill-In screen 705 may present detailed signal level information for upstream transmit power 735, upstream receive power 740 and upstream signal to noise ratio 745. For the downstream signals, the system provides for 750 downstream receive power and downstream signal to noise ration 755. In each display window, details of the specified signal and network element can be viewed. The RF Drill-In screen 705 also provides a compare checkbox, button or control 760 that allows the tester to select multiple networks and/or network elements for the purpose of comparing their real-time or historical data with the network or element currently being tested. Actuating the compare control 760 opens a modem compare screen that will be described in the following section.

Figure 7B:
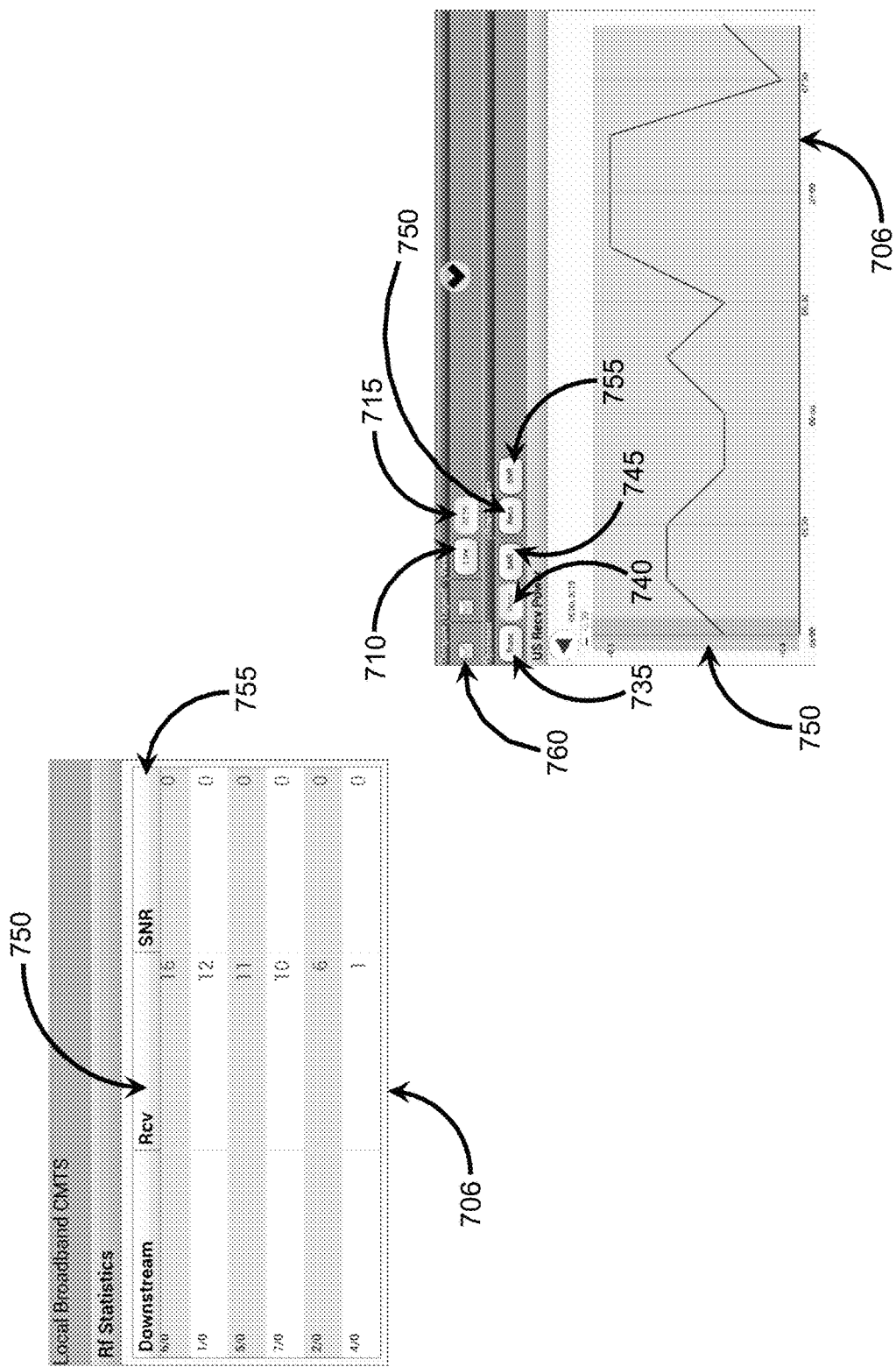
FIG. 7B illustrates an exemplary mobile device RF Drill-In screen allowing identification of signal sources and levels.

The broadband diagnostics system also provides a mobile device version of the RF Drill-in functionality. FIG. 7B illustrates both a digitally represented screen shot showing levels and references as numbers, in addition to a representation that shows the actual signal in a graphical representation. Details regarding the mobile device RF Drill-in will now be described with reference to FIG. 7B. FIG. 7B illustrates an enhanced RF display or RF-Drill-In screen 706. As can be seen in the RF-Drill-In screen 706, a tester may select multiple timeframes for viewing historical data pertaining to the network and/or network elements being tested. These timeframes include live 710, which is a real-time display of network activities happening now and 24 hours 715, which provides a 24 hour view of the network activities. While the broadband diagnostics system can be configured for virtually any timeframe for reviewing historical data, the timeframes 710 and 715 above were chosen for ease of explanation.

In conjunction with the timeframes 710 and 715 that can be selected for viewing, the RF Drill-In screen 706 may present detailed signal level information for upstream transmit power 735, upstream receive power 740 and upstream signal to noise ratio 745. For the downstream signals, the system provides for 750 downstream receive power and downstream signal to noise ration 755. In each display window, details of the specified signal and network element can be viewed. The RF Drill-In screen 706 also provides a compare checkbox, button or control 760 that allows the tester to select multiple networks and/or network elements for the purpose of comparing their real-time or historical data with the network or element currently being tested. Actuating the compare control 760 opens a modem compare screen that will be described in the following section.

Modem Compare

Figure 8A:
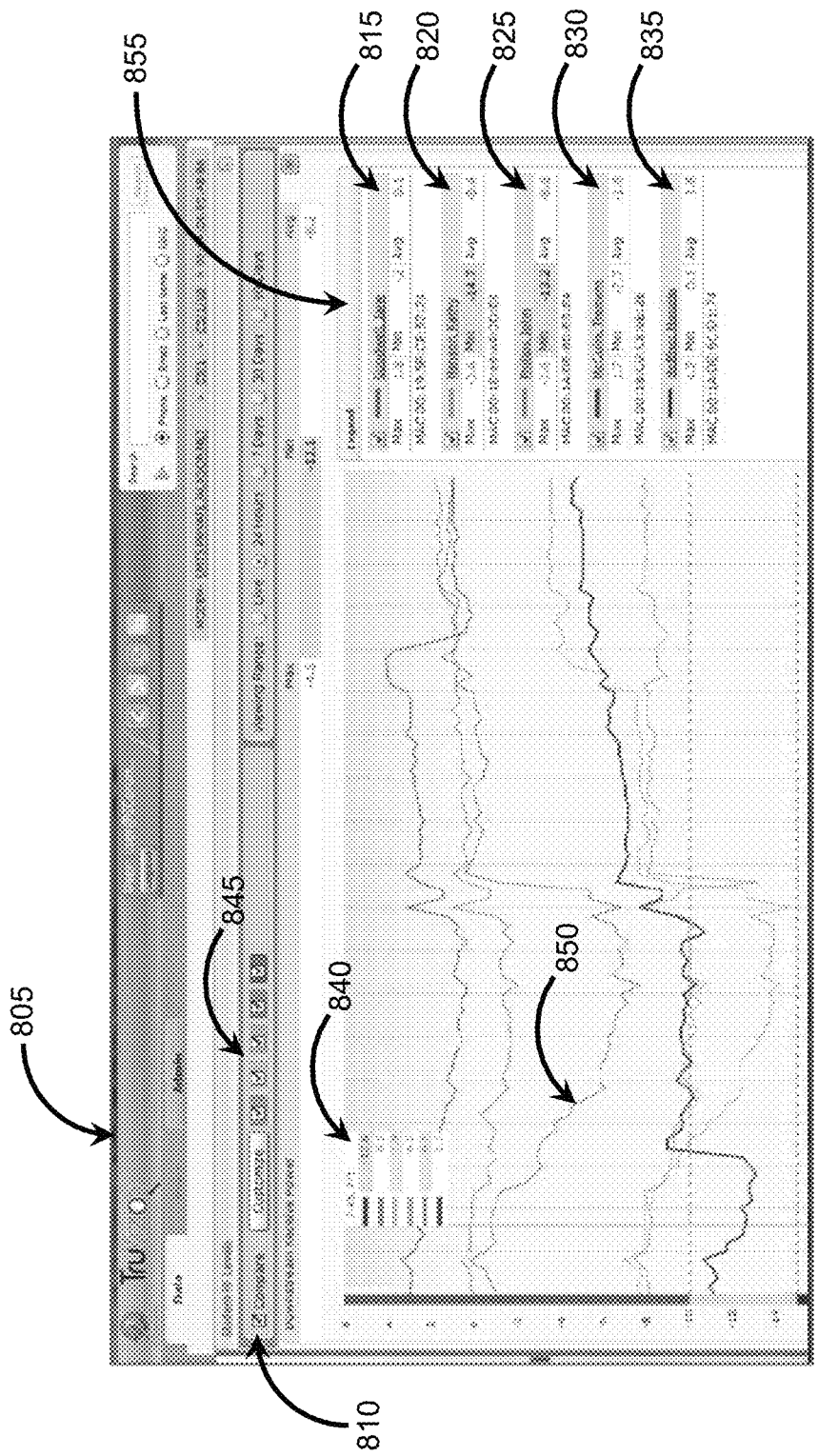
FIG. 8A illustrates an exemplary modem compare screen and the associated features.

FIG. 8A illustrates an exemplary modem compare screen 805. In general, the modem compare screen 805 allows the tester to select a group of other networks or network elements for the purpose of using their diagnostic information (e.g., signal levels and detailed functional information) as reference information for use in comparison with the diagnostic information for a network or element being tested. This functionality provides a significant advantage, as it allows trends to be identified, categorized and tracked. It also provides the capability of identifying performance issues (like performance degradation) before a network or element thereof actually fails. As stated above, a modem compare screen 805 may be accessed by engaging a compare function as described above with regard to FIG. 8A.

In a modem compare screen 805, a tester can select one or more networks and/or elements he or she desires to compare to the currently monitored circuit. In this discussion, it is assumed that the tester is looking at demarcation devices, specifically modems. As shown in this example, each modem is identified by a customer name 815. The tester has selected five different customer modems 815, 820, 825, 830, 835 to compare to the currently monitored network. At any time during the comparison, the tester can add or remove comparison networks and elements by de-selecting them using the check box 845 or one or more of the individual check boxes 815, 820, 825, 830, 835.

Each signal level 850 may be overlaid over another to give the tester a side-by-side comparison of the network elements being compared such as shown in FIG. 8A. A color-coded table 840 may be provided to quickly identify which signal belongs to which element being tested or compared. The color codes will be accordingly reflected in each individual signal 850 and also reflected in the legend 855 containing the individual network elements 815, 820, 825, 830, 835 being tested. In this manner, the modem compare screen 805 and features thereof provide detailed information on each network element.

Geographically, the broadband diagnostics system may reside virtually anywhere on a network. The broadband diagnostics system need only to have access to the network to view, test, troubleshoot and otherwise interact with the associated network and network elements. This immunity to geographic constraints gives a tester the versatility to engage and interact with the network under test from any location of their choosing. In addition, because the broadband diagnostics system may be software based, it can reside in various devices, such as but not limited to personal computers, desktop computers, main frame test systems, portable testing devices, smartphones, pads, tablets and other wired and wireless devices containing a processor, memory and communications capabilities.

Figure 8B:
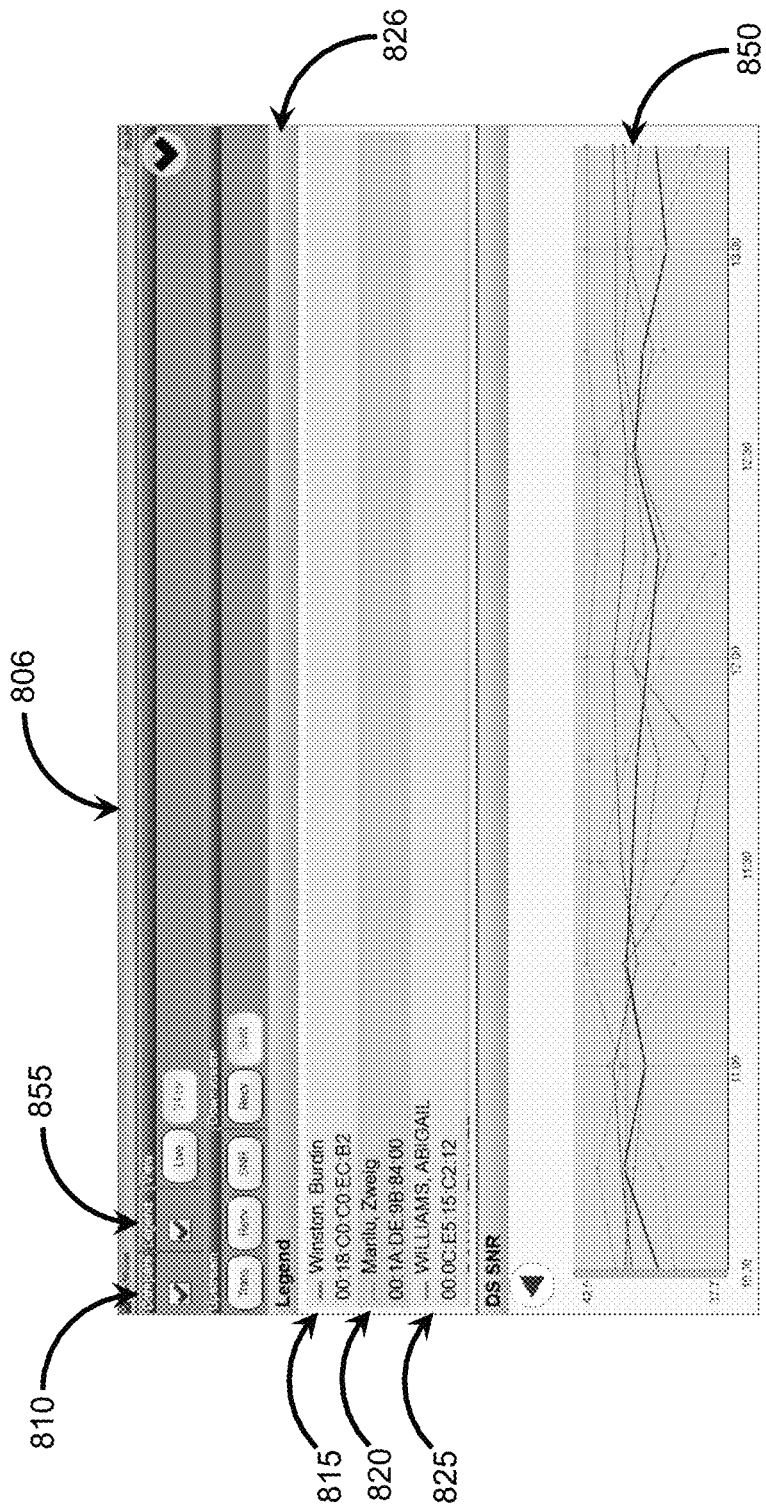
FIG. 8B illustrates an exemplary mobile device modem compare screen and the associated features.

The broadband diagnostics system also provides a mobile version of the modem compare functionality. This feature will now be described with reference to FIG. 8B. FIG. 8B illustrates an exemplary modem compare screen 806 for mobile devices. In general, the modem compare screen 806 allows the tester to compare 810 a group of other networks or network elements for the purpose of comparing their signal levels and detailed functional information with the network or element being tested. For the mobile version of this feature, the unit automatically selects the closest geographically located network elements to the unit under test for comparison. While the system is capable of selecting more or less than five comparable devices for the comparison, this example limits the number to five for ease of explanation. This functionality provides a significant advantage, as it allows trends to be identified, categorized and tracked. It also provides the capability of identifying performance issues (like performance degradation) before a network or element thereof actually fails. A modem compare screen 806 may be accessed by engaging a compare function 810 by actuating the check box provided.

In a modem compare screen 806, a tester can select one or more networks and/or elements he or she desires to compare to the currently monitored circuit. In this discussion, it is assumed that the tester is looking at demarcation devices, specifically modems. As shown in this example, each modem is identified by a customer name 815. While only 3 of the customer modems 815, 820 and 825 are shown in FIG. 8B, the tester has visibility to more. Additional visibility to the elements can be achieved by scrolling the legend 826 window to reveal the remainder of the customer modems.

Each signal level 850 may be overlaid over another to give the tester a side-by-side comparison of the network elements being compared such as shown in FIG. 8B. While reference 8B is in black and white, the screen representations for both portable and fixed device iterations of the broadband diagnostics system are color-coded to quickly identify which signal belongs to which element being tested or compared. The color codes will be accordingly reflected in each individual signal 850 and also reflected in the legend 826 containing the individual network elements 815, 820 and 825 being tested. In this manner, the modem compare screen 806 and features thereof provide detailed information on each network element.

Typical Application of the Broadband Diagnostics System

Figure 9A:
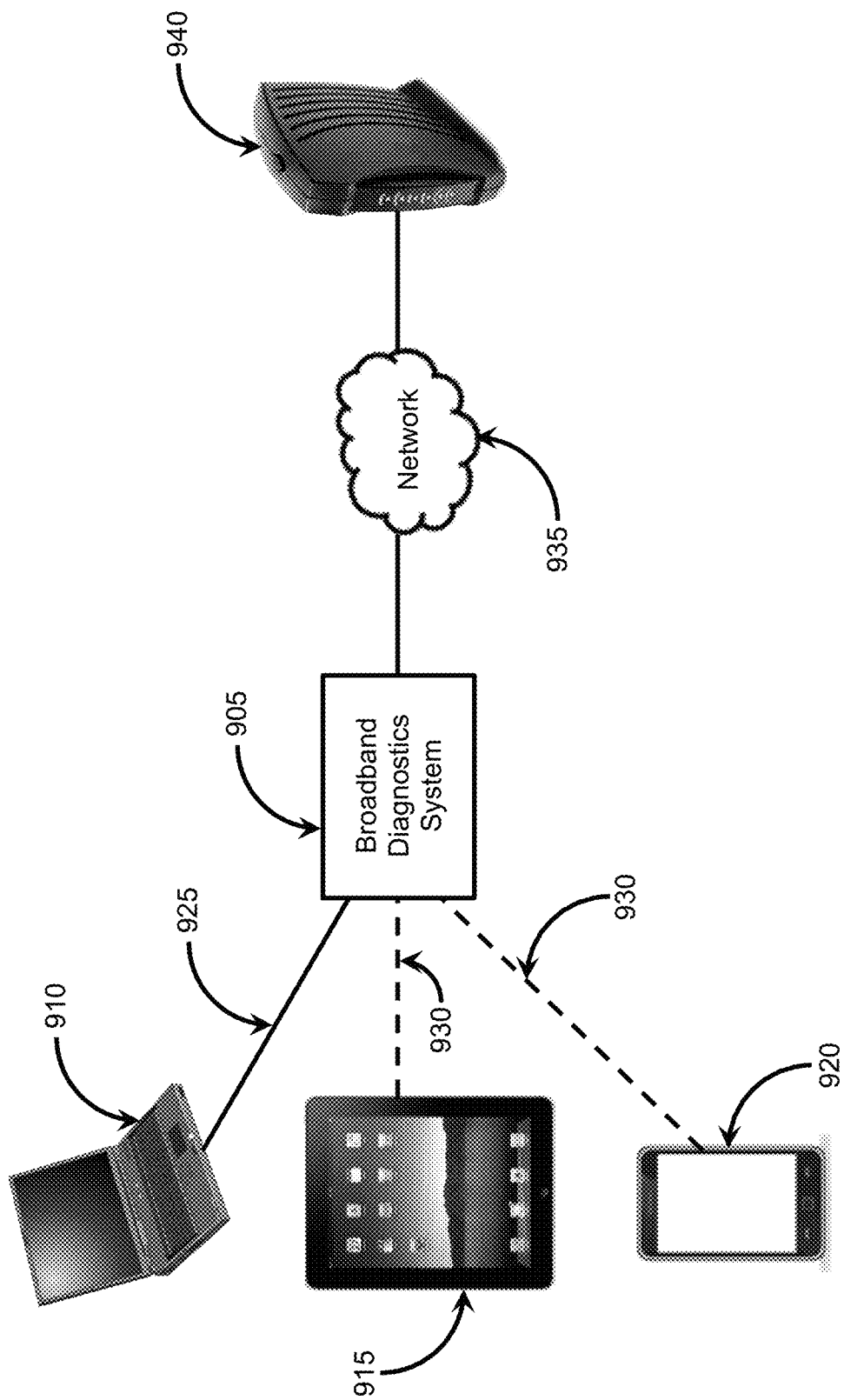
FIG. 9A is a block diagram illustrating an exemplary environment of use for a broadband diagnostics system.

FIG. 9A is a block diagram showing a typical arrangement of a broadband diagnostics system 905 and a network and/or circuit under test. Operation of the broadband diagnostics system 905 will now be described with reference to FIG. 9A. As can be seen in FIG. 9A, the broadband diagnostics system 905 can be accessed either locally or remotely through wired or wireless connections by personal or desktop computers 910, tablets or pads 915, smartphones 920 and other devices capable of wired or wireless communications. To illustrate, a computer 910 may connect to the broadband diagnostics system 905 via a wired connection 925, but both the tablet 915 and smartphone 920 devices are accessing the system 905 via a wireless 930 connection.

In operation, commands may be generated at any of the client devices 910, 915, 920 and sent to the broadband diagnostics system 905. These commands would then be sent from the broadband diagnostics system 905 through a network 935 to the customer's equipment 940, which in this example is a cable modem. The broadband diagnostics system 905 can now perform tests, issue commands, collect data and otherwise interact with both the network 935 (and any associated elements or equipment within the network) and the customer's equipment 940.

Broadband Diagnostics System Components

The broadband diagnostics system comprises various components and physical elements to govern the communication and interaction portions of the functionality described herein. As previously stated, the broadband diagnostics system may be implemented in software or machine readable code, which can be imbedded/stored in whole or in part and executed by a variety of communications devices, capable of interacting with the network and its associated elements. These devices can include (but are not limited to) smartphones, personal or desktop computers, testing systems, test sets, tablets, pads and other devices. The software or machine readable code may comprise one or more instructions that, when executed, provide the broadband diagnostics system's functionality as described herein. In one or more embodiments, the machine readable code may be fixed on a tangible medium in or accessible to a communication device. The communications and interface portions of an exemplary broadband diagnostics system 905 will now be discussed with reference to FIG. 9B.

Figure 9B:
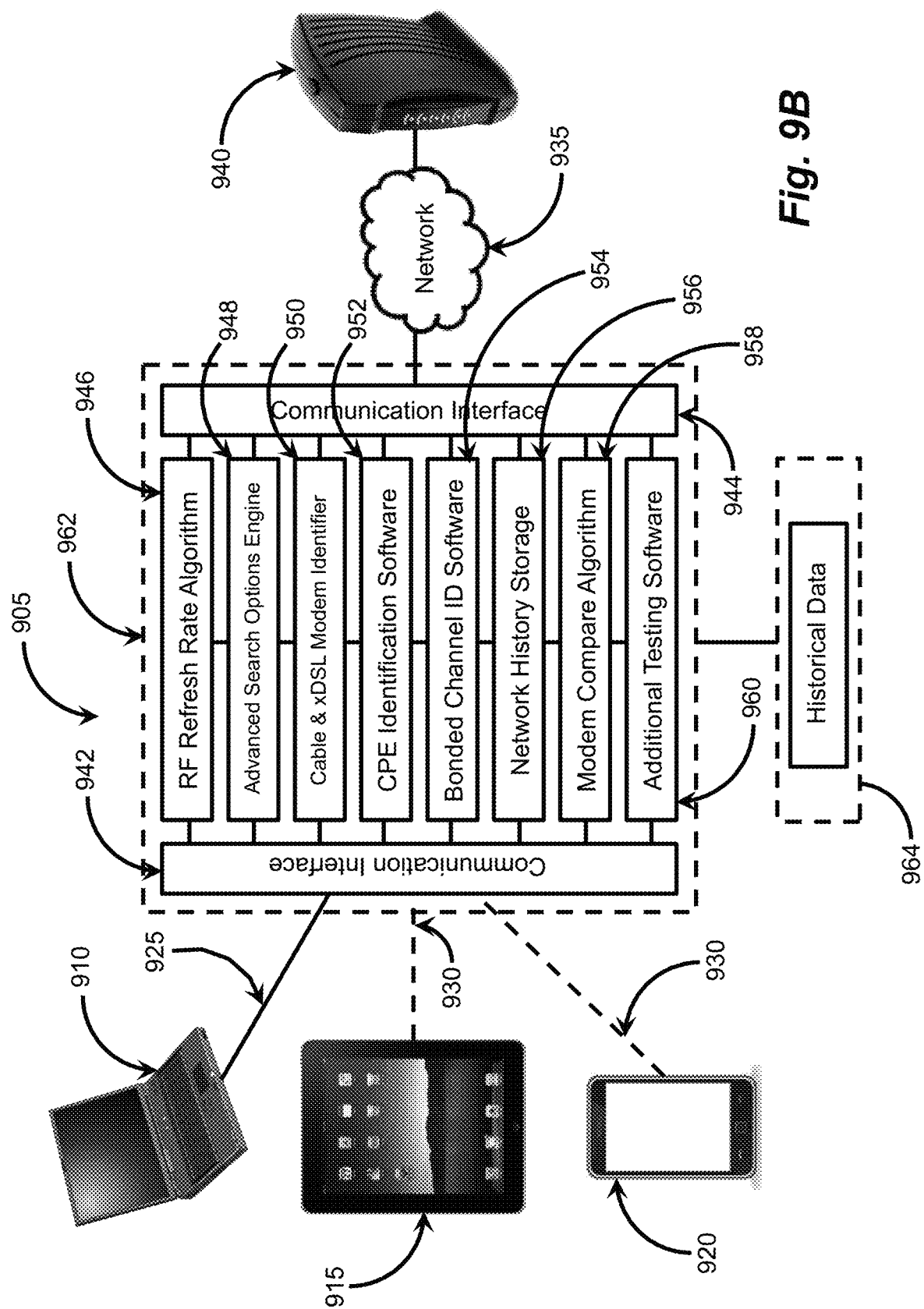
FIG. 9B is a block diagram illustrating components of an exemplary broadband diagnostics system.

FIG. 9B is a block diagram illustrating exemplary components of a broadband diagnostics system 905. As can be seen, the broadband diagnostics system 905 may include one or more communications interfaces 942, 944 to communicate with a one or more of a tester's client devices 910, 915, 920 as well as one or more networks 935 or network equipment 940 being tested. In the embodiment of FIG. 9B, a first communication interface 942 is provided at an input side of the broadband diagnostics system 905, while a second communication interface 944 is provided at an output side 944 of the broadband diagnostics system.

Typically, user input from a client device 910, 915, 920 will be received via a first communication interface 942, such as a network interface. Diagnostic information may be communicated to and from the broadband diagnostics system 905 via a second (separate) communication interface 944 that may be in communication with one or more demarcation devices, customer premises equipment or both. The second communication interface 944 may be a network interface or other communication device. It is contemplated that the first and second communication interfaces 942, 944 may be configured to utilize wired or wireless communications.

As disclosed above, the user interface screens described with reference to FIGS. 1A-8B may be presented to a tester's client devices 910, 915, 920. Input from the tester can then be received via the client devices 910, 915, 920, and transmitted from the client devices to the broadband diagnostics system 905 via a communication interface 942. It is noted that the user interface screens may be provided by the client devices 910, 915, 920 themselves (such as through downloadable or other software). Alternatively, the broadband diagnostics system 905 may provide such user interface screens. For example, the broadband diagnostics system 905 may include a web server or the like configured to present the user interface screens on a client device 910, 915, 920 when such screens are desired by a tester.

As can be seen, within the broadband diagnostics system 905, individual machine readable code modules or hardware modules may be provided to support one or more functions of the system, such as to support or provide the RF refresh rate algorithm 946, the advanced search option engine 948, the Cable or xDSL modem identification system 950, customer premises equipment and other equipment identification 952, the identification and testing of individual channels within a bonded channel grouping 954, a repository to store historical data for all networks and elements tested 956, modem comparison using both real time and historical data 958, and any additional testing and troubleshooting software 960.

It is noted that the broadband diagnostics system 905 may include only the machine readable code or hardware modules needed to provide the functionality desired by a tester, such as shown in the controller 962 of FIG. 9B. The machine readable code may be fixed on a tangible medium, such as a data storage device of the broadband diagnostics system 905. In addition or alternatively, the machine readable code may be hardwired in a microprocessor, circuit or the like of the controller 962. A microprocessor, circuit or the like of the controller 962 may be configured to execute the machine readable code to provide the functionality of each module, as detailed herein.

Further details regarding the broadband diagnostics system's modules will now be described. In one or more embodiments, the broadband diagnostics system utilizes an RF refresh rate algorithm 946 that allows the tester to actively track RF signaling as monitored within the system. Since signaling rates of associated network components are always changing, the RF refresh rate algorithm 946 allows the tester to monitor, in real time, the fluctuations and changes associated with the signaling. This ensures rapid trouble isolation and detailed historical data to be recorded and tracked.

In operation, the RF refresh rate algorithm 946 utilizes the communications interfaces 942 and 944 to send and receive signaling information associated with the monitoring activities. The controller 962 manages the interaction between the RF refresh rate algorithm 946 and associated components. As an example, if the tester chooses to store the RF data being monitored, the controller 962 would instruct the RF refresh rate algorithm 946 to allow collection and storage of the data being collected through the network history storage module 956. The modem compare algorithm 958 can also be used in this instance to compare the new RF data being actively recorded through the RF refresh rate algorithm 946 with existing historical data recorded by the network history storage module 956.

The advanced search options engine 948 allows the tester to seek out and identify specific network components by receiving specific parameters about the network components from a tester, and searching for such parameters in historical data recorded by the network history storage module 956 to allow the tester to quickly and easily find the network component they seek. The tester can enter their search parameters or criteria through any of the client devices 910, 915 or 920 and initiate their search through the advanced search options engine 948. Criteria that can be used for the advanced search includes MAC addresses, IP addresses, EMTA data, email addresses, user first name, user last name, user telephone number, service provider, carrier ID, geographical data (longitude and latitude) etc. Any of these criteria can be used individually, or in any combination to initiate the search. The search criteria may be received through the communications interface 942 and controlled by the controller 962. The controller 962 executes the search accordingly (such as via the network history storage module 956) and the corresponding results are returned to the tester through the communications interface 942 to their client device 910, 915 or 920. In operation, the controller 962 will typically initiates an immediate query with the network history storage module 956 to return the results in a timely fashion.

The cable & xDSL modem identifier module 950 allows the tester to quickly and easily identify the type of equipment deployed at the customer premise to enable rapid trouble isolation and network configuration analysis. In operation, the cable & xDSL modem identifier module 950 initiates a query to the customer premise equipment 940 (in this case a modem) requesting information including model number, MAC address, IP address, LAN address, build date, software ID information, Firmware ID information and other criteria. This query allows the tester to quickly identify the customer equipment 940 to initiate trouble resolution activities. The cable & xDSL modem identifier module 950 operates in conjunction with the communications interfaces 942 and 944 to collect data, and with the network history storage module 956 and the CPE identification software 952 to quickly identify, log and store the information about the customers equipment. This activity also allows the immediate comparison with historical data stored by the network history storage module 956. All modules within the system can be initiated and utilized at any time during this activity. As an example, if the tester chooses to compare the customer equipment 940 currently being tested with historical data, this can be initiated through the modem compare algorithm 958. The modem compare algorithm 958 may be configured to compare corresponding or matching parameters between and to return a result identifying the differences therebetween.

Similar in function to the cable & xDSL modem identifier module 950, the CPE identification software 952 allows the tester to determine what components reside at the customer's premises beyond the demarcation point. In most cases of network deployment, the demarcation is the customer's modem 940. Equipment deployed beyond the modem 940 is typically regarded as the responsibility of the user or LAN owner, and therefore is not tested. The CPE identification software 952 allows the tester to quickly and easily identify all equipment connected to the modem 940 on the customers' side of the demarcation point. Equipment can include (but is not limited to) printers, desktop or laptop computers, wired or wireless routers, firewalls, patch bays and other equipment that may be deployed on the customers LAN. The CPE identification software 952 allows the tester to easily get a picture of the entire LAN to determine if the trouble being experienced is potentially being generated beyond the demarcation point. As with other system modules, the CPE identification software 952 operates in conjunction with the controller 962 and the communications modules 942 and 944 to quickly report the information collected from the customers' network interface 940. The CPE identification software 952 can also access historical data recorded by the network history storage module 956, and utilize modem compare algorithm 958 and additional testing software 960 to allow the tester to isolate, diagnose and resolve troubles quickly.

The bonded channel ID software 954 allows the tester to determine what type of network 935 the customer equipment 940 is being routed through, if any. The bonded channel ID software 954, working in conjunction with the controller 962 and the communications interfaces 942 and 944 allows the tester to see the network channel configuration through which the customer equipment 940 is being managed. Channel configurations vary depending on the carrier and provider, and identification of the channel arrangement is vital to tracking signal levels and information pertaining to the network 935. In typical operation, the tester would initiate a command through a client device 910, 915 or 920. The command would be routed through the communications interface(s) 942 or 944 to the bonded channel ID software 954, which would detect/identify the network channel specific information. The resulting information may then be transmitted from the bonded channel ID software 954 back to a tester's client device 910, 915 or 920 via a communications interface 942. Once the network channel specific information has been determined, the tester can choose the appropriate next testing step, as determined by the network diagnostics. Network channel specific information may be stored in the historical data by the network history storage module 956 for subsequent retrieval by the tester.

The network history storage module 956 repository may operate in conjunction with the other modules within the controller 962 to collect, store and recall historical data. As can be seen, the network history storage module 956 provides a repository for all of the data collected and monitored, including details specific to the customer. It is noted that the historical data may be stored on one or more storage devices 964 internal to or remotely accessible by the controller 962.

The historical data stored by the network history storage module 956 can be immediately recalled at any time from the client devices 910, 915 or 920 to allow the tester to view stored historical data, initiate a modem compare algorithm 958, identify customers equipment with the CPE identification software 952, request search data with the advanced search options engine 948, executed additional testing software 960, identify the type of modem with the cable & DSL modem identifier 950, or to compare RF signals and data with the RF refresh rate algorithm 946.

The modem compare algorithm 958 allows the tester to compare the behavior of the existing modem under test 940 with historical data. The modem compare algorithm 958 allows real time data regarding particular customer equipment 940 (i.e., modem) to be collected and compared. By allowing the tester to compare the behavior of the customer equipment 940 under test with historical data, the tester can quickly and easily identify mild to severe fluctuations or variances that exist within the network communications 935. As with other system modules, the modem compare algorithm may utilize the communications interfaces 942 and 944 to communicate with a tester's client device 910, 915 and 920 and the customer equipment 940 being tested. All activities of the modules may be monitored and managed/coordinated by the controller 962. The modem compare algorithm 958 can be used in conjunction with any other module in the system to allow the tester to quickly and easily isolate, diagnose and resolve the case of trouble.

In addition to the features disclosed above, the broadband diagnostics system 905 may store additional testing software 960 for execution/use as desired or needed. The additional testing software 960 may be configured to perform various tests including but is not limited to resistance testing, capacitance testing, voltage testing, signal level testing, frequency testing and other generally known diagnostic tests. The additional testing software 960 may utilize a communication interface 944 to conduct its tests. Like all other modules within the system, the additional testing software 960 may receive testing instructions from a client device 910, 915, 920 via the communications interface 942 to allow the tester to initiate additional functional tests.

The additional testing software 960 may be managed by the controller 962 and may communicate with other modules within the controller 962 to carry out its testing functionality. In a typical scenario, the additional testing software 960 can collect and store data in the historical data via the network history storage module 956, while initiating a modem compare algorithm 958 to evaluate the network and components being reviewed.

A controller 962 comprising a processor, microcontroller, integrated or other circuit or the like will typically be included the broadband diagnostics system 905 as well, such as to control the operation of such components during operation of the broadband diagnostics system. For example, a controller 962 may be connected to the first and second communication interfaces 942, 944 to control operation thereof. It is noted that the controller 962 may include or access one or more data storage devices during its operation. For example, the controller 962 may execute machine readable code from a data storage device 964, or store data resulting from tests in a data storage device temporarily or in a nonvolatile manner. In one or more embodiments, the primary function of the controller 962 is to manage the interface, interaction and command distribution between the associated functional modules illustrated therein.

The broadband diagnostics system 905 may optionally include one or more output devices to provide output to a display screen, speaker, printer or other peripheral if desired. In addition, one or more input devices, such as keyboards, mice, touch screens, and other user interface devices may be optionally provided to control, maintain, or setup the broadband diagnostics system 905 in some embodiments. Otherwise it is contemplated that control, maintenance and/or setup of the broadband diagnostics system 905 may be accomplished remotely through a client device 910, 915, 920.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A broadband diagnostics device comprising:
a first communication device in communication with a demarcation device, wherein diagnostic information is received from the demarcation device via the first communication device and the demarcation device and the broadband diagnostics device are remote from one another;
a second communication device in communication with one or more client devices, wherein user input provided by a user at one or more client devices is received from the one or more client devices via the second communication device, the user input requesting particular information in the diagnostic information;
a storage or memory device that stores the diagnostic information received from the demarcation device via the first communication device as historical testing data; and
one or more processors that:
receive the user input;
identify a subset of the diagnostic information consisting of channel information for the demarcation device based on the user input; and
transmit the subset of diagnostic information including at least some of the historical testing data periodically at one or more predefined periods to the one or more client devices via the second communication device even when the demarcation device is inaccessible to the one or more client devices;
wherein the demarcation device is at the customer premises, and the user and the one or more client devices are remote from the broadband diagnostics device and the customer premises when the user input is received; and
wherein the broadband diagnostics device is remote from the customer premises.

2. The broadband diagnostics device of claim 1, wherein the one or more client devices display the subset of the diagnostic information via one or more display devices.

3. The broadband diagnostics device of claim 1, wherein the one or more client devices are on a network distinct from that of the demarcation device, wherein the user input is received from a user at the one or more client devices.

4. The broadband diagnostics device of claim 1, wherein the processor also transmits reference diagnostic information comprising a plurality of signal levels over time along with the subset of diagnostic information.

5. The broadband diagnostics device of claim 1, wherein the one or more predefined periods are defined by a refresh rate of the one or more client devices.

6. A non-transitory storage medium storing instructions that, when executed, cause one or more processors of a broadband diagnostics device comprising a first communication device and a second communication device to:
receive diagnostic information from a demarcation device at a customer premises via the first communication device, wherein the demarcation device and the broadband diagnostics device are remote from one another;
store the diagnostic information on a storage or memory device remote from the customer premises;
receive user input requesting particular information in the diagnostic information from one or more users at one or more client devices via the second communication device, wherein the one or more users and the one or more client devices are remote from the broadband diagnostics device and the demarcation device when the user input is received from the one or more users;
identify a subset of diagnostic information from the diagnostic information based on the user input; and
periodically transmit the subset of diagnostic information to the one or more client devices via the second communication device at one or more predefined periods of time even when the demarcation device is inaccessible to the one or more client devices;
wherein the broadband diagnostics device is remote from the customer premises.

7. The non-transitory storage medium of claim 6, wherein the one or more predefined periods of time are defined by a refresh rate received from the one or more client devices.

8. The non-transitory storage medium of claim 6, wherein the one or more predefined periods of time are received from the one or more client devices.

9. The non-transitory storage medium of claim 6, wherein the instructions also cause the one or more processors to transmit reference diagnostic information to the one or more client devices via the second communication device.

10. The non-transitory storage medium of claim 6, wherein the subset of diagnostic information comprises channel information.

11. The non-transitory storage medium of claim 6, wherein the instructions also cause the one or more processors to present the subset of diagnostic information on a display device.

12. The non-transitory storage medium of claim 6, wherein the instructions also cause the one or more processors to present the subset of diagnostic information along with reference diagnostic information comprising a plurality of signal levels over time on a display device.

13. A diagnostic method implemented by a broadband diagnostics device comprising a first communication device and a second communication device, the method comprising:
receiving diagnostic information from a demarcation device at a customer premises via the first communication device, wherein the demarcation device and the broadband diagnostics device are remote from one another;
storing the diagnostic information on a storage or memory device remote from the customer premises;
receiving user input requesting particular information in the diagnostic information from a user via the second communication device, wherein the user is remote from the broadband diagnostics device and the demarcation device when the user input is received from the user;
identifying a subset of the diagnostic information from the diagnostic information based on the user input;
transmitting the subset of diagnostic information to one or more client devices at a periodic rate via the second communication device even when the demarcation device is inaccessible to the one or more client devices; and
presenting the subset of diagnostic information on a display device;
wherein the broadband diagnostics device is remote from the customer premises.

14. The method of claim 13, wherein the subset of diagnostic information comprises channel information.

15. The method of claim 13, wherein the subset of diagnostic information is presented along with reference diagnostic information comprising a plurality of signal levels over time on the display device.

16. The method of claim 13 further comprising storing the diagnostic information on a storage or memory device.

17. The broadband diagnostics device of claim 1, wherein the one or more processors compare the historical test data to newly received diagnostic information.

18. The broadband diagnostics device of claim 1, wherein the diagnostic information comprises bonded channel information.

19. The non-transitory storage medium of claim 6, wherein the diagnostic information comprises bonded channel information.

20. The method of claim 13, wherein the diagnostic information comprises bonded channel information.

* * * * *